(12) United States Patent
Wu et al.

(10) Patent No.: US 7,700,713 B2
(45) Date of Patent: Apr. 20, 2010

(54) GOLF BALL COMPOSITIONS WITH IMPROVED TEMPERATURE PERFORMANCE, HEAT RESISTANCE, AND RESILIENCY

(75) Inventors: Shenshen Wu, North Dartmouth, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 12/359,647

(22) Filed: Jan. 26, 2009

(65) Prior Publication Data

US 2009/0137344 A1 May 28, 2009

Related U.S. Application Data

(63) Continuation of application No. 11/607,917, filed on Dec. 4, 2006, now Pat. No. 7,482,422, which is a continuation of application No. 10/820,122, filed on Apr. 8, 2004, now Pat. No. 7,163,994.

(51) Int. Cl.
*A63B 37/12* (2006.01)
*A63B 37/00* (2006.01)
*C08G 18/10* (2006.01)

(52) U.S. Cl. .......................... 528/60; 528/68; 473/371; 473/378

(58) Field of Classification Search ................ None
See application file for complete search history.

(56) References Cited

U.S. PATENT DOCUMENTS

| | | | |
|---|---|---|---|
| 3,583,943 A | 6/1971 | Weber | 528/45 |
| 4,123,061 A | 10/1978 | Dusbiber | 473/377 |
| 4,124,573 A | 11/1978 | Watabe et al. | 528/53 |
| 4,560,168 A | 12/1985 | Aoyama | 273/232 |
| 4,925,193 A | 5/1990 | Melvin et al. | 273/232 |
| 4,956,438 A | 9/1990 | Ruetman et al. | 528/60 |
| 4,960,281 A | 10/1990 | Aoyama | 273/232 |
| 5,071,578 A | 12/1991 | Ohkubo et al. | 252/62.54 |
| 5,248,878 A | 9/1993 | Ihara | 219/121.69 |
| 5,249,804 A | 10/1993 | Sanchez | 273/232 |
| 5,334,673 A | 8/1994 | Wu | 273/235 R |
| 5,484,870 A | 1/1996 | Wu | 528/28 |
| 5,562,552 A | 10/1996 | Thurman | 473/379 |
| 5,575,477 A | 11/1996 | Hwang | 473/379 |
| 5,661,207 A | 8/1997 | Carlson et al. | 524/414 |
| 5,688,181 A | 11/1997 | Albert | 473/61 |
| 5,688,191 A | 11/1997 | Cavallaro et al. | 473/373 |
| 5,692,974 A | 12/1997 | Wu et al. | 473/377 |
| 5,713,801 A | 2/1998 | Aoyama | 473/354 |
| 5,803,831 A | 9/1998 | Sullivan et al. | 473/374 |
| 5,816,943 A | 10/1998 | Masutani et al. | 473/365 |
| 5,820,488 A | 10/1998 | Sullivan et al. | 473/374 |
| 5,849,168 A | 12/1998 | Lutz | 264/755 |
| 5,885,172 A | 3/1999 | Hebert et al. | 473/354 |
| 5,899,818 A | 5/1999 | Zider et al. | 473/324 |
| 5,908,358 A | 6/1999 | Wu | 473/378 |
| 5,915,373 A | 6/1999 | Malover et al. | 126/263.02 |
| 5,919,100 A | 7/1999 | Boehm et al. | 473/354 |
| 5,957,787 A | 9/1999 | Hwang | 473/379 |
| 5,965,669 A | 10/1999 | Cavallaro et al. | 525/221 |
| 5,981,654 A | 11/1999 | Rajagopalan | 525/66 |
| 5,981,658 A | 11/1999 | Rajagopalan et al. | 525/72 |
| 6,056,842 A | 5/2000 | Dalton et al. | 156/243 |
| 6,075,223 A | 6/2000 | Harrison | 219/121.85 |
| 6,099,415 A | 8/2000 | Lutz | 473/357 |
| 6,103,822 A | 8/2000 | Housel et al. | 524/840 |
| 6,149,535 A | 11/2000 | Bissonnette et al. | 473/354 |
| 6,180,040 B1 | 1/2001 | Ladd et al. | 264/248 |
| 6,180,722 B1 | 1/2001 | Dalton et al. | 525/193 |
| 6,207,784 B1 | 3/2001 | Rajagopalan | 528/71 |
| 6,213,898 B1 | 4/2001 | Ogg | 473/383 |
| 6,241,622 B1 | 6/2001 | Gobush et al. | 473/199 |
| 6,248,804 B1 | 6/2001 | Lutz | 523/160 |
| 6,286,364 B1 | 9/2001 | Aoyama et al. | 73/65.03 |
| 6,290,615 B1 | 9/2001 | Ogg | 473/378 |
| 6,309,313 B1 | 10/2001 | Peter | 473/378 |
| 6,315,915 B1 | 11/2001 | Hebert et al. | 216/67 |
| 6,338,684 B1 | 1/2002 | Winfield et al. | 473/378 |
| 6,358,161 B1 | 3/2002 | Aoyama | 473/383 |
| 6,369,125 B1 | 4/2002 | Nesbitt | 522/142 |
| 6,383,092 B1 | 5/2002 | Ogg | 473/378 |
| 6,409,615 B1 | 6/2002 | McGuire et al. | 473/383 |
| 6,458,307 B2 | 10/2002 | Inoue et al. | 264/232 |
| 6,462,303 B1 | 10/2002 | Brown | 219/121.69 |
| 6,488,591 B1 | 12/2002 | Gobush et al. | 473/199 |
| 6,494,795 B2 | 12/2002 | Sullivan | 473/372 |

(Continued)

FOREIGN PATENT DOCUMENTS

JP 09040734 2/1997

OTHER PUBLICATIONS

U.S. Appl. No. 10/409,144, filed Apr. 9, 2003 entitled "Polyurea and Polyurethane Compositions for Golf Equipment".

(Continued)

*Primary Examiner*—David Buttner
(74) *Attorney, Agent, or Firm*—Hanify & King, P.C.

(57) ABSTRACT

Golf ball compositions, and components formed therefrom, including trifunctional materials, such as trifunctional isocyanates, polyols, and amines, that have improved performance and durability characteristics, e.g., improved heat resistance, improved resiliency, and dimensional stability.

16 Claims, 5 Drawing Sheets

U.S. PATENT DOCUMENTS

| | | | |
|---|---|---|---|
| 6,500,073 B1 | 12/2002 | Gobush et al. | 473/199 |
| 6,500,495 B2 | 12/2002 | Lutz | 427/500 |
| 6,835,794 B2 | 12/2004 | Wu et al. | 528/64 |
| 7,163,994 B2* | 1/2007 | Wu et al. | 528/60 |
| 7,482,422 B2* | 1/2009 | Wu et al. | 528/60 |
| 2001/0005699 A1 | 6/2001 | Morgan | |
| 2001/0009310 A1 | 7/2001 | Hebert | |
| 2001/0018375 A1 | 8/2001 | Hayashi | |
| 2001/0019971 A1 | 9/2001 | Hayashi | |
| 2002/0006837 A1* | 1/2002 | Dalton et al. | 473/361 |
| 2002/0025862 A1 | 2/2002 | Sullivan | |
| 2002/0028885 A1 | 3/2002 | Sullivan | |
| 2002/0082358 A1 | 6/2002 | Ohira | |
| 2002/0151380 A1 | 10/2002 | Sullivan | |
| 2003/0078348 A1 | 4/2003 | Rajagopalan | |
| 2003/0096936 A1* | 5/2003 | Wu et al. | 528/76 |
| 2003/0106442 A1 | 6/2003 | Gosetti | |
| 2003/0109329 A1 | 6/2003 | Kennedy | |
| 2003/0114255 A1 | 6/2003 | Dalton | |
| 2003/0119989 A1 | 6/2003 | Ladd | |
| 2003/0153716 A1 | 8/2003 | Wu | |
| 2003/0158001 A1 | 8/2003 | Morgan | |
| 2003/0212240 A1 | 11/2003 | Wu | |
| 2003/0225243 A1* | 12/2003 | Dewanjee | 528/68 |
| 2005/0228160 A1* | 10/2005 | Wu et al. | 528/60 |

OTHER PUBLICATIONS

U.S. Appl. No. 10/339,603, filed Jan. 10, 2003 entitled "Polyurethane Compositions for Golf Balls".

U.S. Appl. No. 10/167,744, filed Jun. 13, 2002 entitled "Golf Ball With Multiple Cover Layers".

* cited by examiner

GOLF BALL COMPOSITIONS WITH IMPROVED TEMPERATURE PERFORMANCE, HEAT RESISTANCE, AND RESILIENCY

CROSS-REFERENCE TO RELATED APPLICATIONS

This application is a continuation of U.S. patent application Ser. No. 11/607,917, filed Dec. 4, 2006, now U.S. Pat. No. 7,482,422, which is a continuation of U.S. patent application Ser. No. 10/820,122, filed Apr. 8, 2004, now U.S. Pat. No. 7,163,994, the entire disclosures of which are incorporated by reference herein.

FIELD OF THE INVENTION

The invention relates to golf ball components including trifunctional materials that have improved performance and durability characteristics. In particular, the present invention is directed to various golf ball components, e.g., golf ball covers, cores, and intermediate layers, formed from trifunctional isocyanates, polyols, and amines that have improved resiliency at non-optimal temperature conditions. In addition, the present invention relates to golf ball components formed from trifunctional materials that have improved heat resistance over golf ball components not including trifunctional materials.

BACKGROUND OF THE INVENTION

Golf ball components are formed from a variety of compositions. For example, golf ball cores, intermediate layers, and covers may be formed from materials ranging from balata to ionomer resin to polyurethane or polyurea. Manufacturers constantly experiment with the different materials for use in the various golf ball layers in order to provide golf balls that have desirable aerodynamic properties, soft "feel", and increased durability. Therefore, depending on the materials used to construct the golf ball components, the golf ball may have long distance, but poor durability, or have good durability, but a hard "feel".

Golf balls function partly as a result of their ability to transfer kinetic energy of a moving golf club head to the golf ball. The ability to transfer this kinetic energy is related to the modulus of elasticity of the various polymeric compounds that make up the components of the golf ball in addition to the material properties of the golf club. Because the modulus of elasticity varies with temperature, high and low temperatures will typically effect the performance of the golf ball. In fact, the coefficient of restitution (COR), which is the ratio of the outbound or rebound velocity to the incoming or inbound velocity, may be used, at least in part, as an indicator of performance at various temperatures. And, as known to those of ordinary skill in the art, the COR of most golf balls decreases as the temperature of the environment decreases. Thus, golfers in cold climates may experience shorter driving distance and a "hard feel" due to the COR loss of the golf ball at non-optimal temperatures.

For practical purposes, the optimum temperature for maximum driving distance and a "soft" feel is about 59° F. to about 95° F. Depending on the season and the climate, golf balls can be well below this optimum temperature range. Generally, the higher the temperature within a given range, the higher the modulus of elasticity, and, conversely, the lower the temperature, the lower the modulus of elasticity. In other words, as the temperature drops, golf balls generally become stiff and usually cannot be driven as far as when they are warm. In fact, golf balls stored in an unheated area may have a ball temperature of 32° F. or less, which may have a dramatic effect on the driving distance and feel of the golf ball.

One way to avoid playing with a golf ball that has a temperature outside of the optimum range is to manufacture the golf ball with a qualitative temperature indicator. Examples of golf balls having such temperature indicators are disclosed in U.S. Patent Publication No. 2003/0109329. Another way to compensate for non-optimum ball temperatures is to use a portable golf ball warmer, such as the one disclosed in U.S. Pat. No. 5,915,373.

Still another attempt at reducing the effect of non-optimal temperatures on driving distance and golf ball feel is to use a golf club that compensates for various changes in stiffness of a golf ball. U.S. Pat. No. 5,899,818 discloses a golf club head having temperature-variable impact properties using a shape memory alloy that becomes stiffer at higher temperatures and more elastic at lower playing temperatures. While these methods allow a player to use a golf ball in non-optimal playing conditions and may allow the golfer to achieve adequate distance, they require special equipment to do so.

Yet another known problem with conventional golf balls is the degradation of the materials used to form the golf ball components at elevated temperatures. For example, wrinkling of the golf ball component may occur at about 50° C. In fact, even the most advanced light stable polyurethane and polyurea compositions have been shown to be susceptible to heat degradation during additional processing steps, e.g., coating and marking, and upon storage in non-optimal temperatures.

With regard to material degradation at elevated temperatures, several manufacturers have attempted to compensate for any golf ball cover degradation upon application of heat by using coatings having contraction and expansion properties. For example, U.S. Pat. No. 5,816,943 is directed to a coating having a higher heat resistance than the cover material to prevent shallowing of dimples or dulling of dimple edges upon the coating application.

In addition, various golf ball compositions with purported improved light stability and durability have been disclosed. For example, U.S. Pat. No. 6,458,307 is directed to thermoplastic cover materials with a reported improvement in light stability, cut resistance, and abrasion resistance. U.S. Pat. No. 6,369,125 relates to crosslinkable thermoplastic compositions that can be melted and reformed and also have improved scuff and cut resistance over conventional balata covers.

While the efforts described above compensate for many problems associated with golf play during non-optimal conditions, no method of material has addressed all of the problems at once. In addition, most of the methods used to compensate for extreme temperature conditions involve the use of a special indicator, club, or warmer. Therefore, there remains a continuing need for novel compositions that solve temperature-related problems of conventionally-formed golf balls and golf clubs, e.g., resiliency and material degradation at non-optimal temperatures. In particular, it would be advantageous to provide a composition using trifunctional materials that provides heat resistance and dimensional stability, as well as improved resiliency, to golf ball and club components formed therefrom at non-optimal temperatures.

SUMMARY OF THE INVENTION

The present invention is directed to a golf ball including at least one layer formed from a composition including at least one trifunctional component selected from the group consisting of a trifunctional isocyanate, a trifunctional amine-terminated component, or a trifunctional curing agent, wherein the coefficient of restitution changes by about 5 percent or less with a corresponding temperature decrease of 15° F. or more. In one embodiment, the coefficient of restitution changes by about 3 percent or less with a corresponding temperature decrease of about 45° F. or more. In another embodiment, the coefficient of restitution has no appreciable change with a corresponding temperature decrease of about 60° F. or more.

The golf ball may include a core and a cover, preferably having a cover formed of the composition. In one embodiment, the cover includes at least two layers. Furthermore, the trifunctional component may be selected from the group consisting of an isocyanurate trimer of hexamethylene diisocyanate, an isocyanurate trimer of toluene diisocyanate, an isocyanurate trimer of isophorone diisocyanate, a blend of isophorone diisocyanate and an isocyanurate trimer of isophorone diisocyanate, and mixtures thereof. Moreover, the trifunctional curing agent may be selected from the group consisting of propylene-oxide based triamine, ethylene oxide triamine, diethylene triamine, trimethylolpropane-based triamine, glycerin-based triamine, N-(2-aminoethyl)-1,3-propylenediamine, and mixtures thereof. In addition, the composition may be thermoset.

The present invention is also directed to a golf ball component formed from a composition including at least one trifunctional component selected from the group consisting of a trifunctional isocyanate, a trifunctional amine-terminated component, or a trifunctional curing agent, wherein the component has a COR profile that exhibits an increase as temperature decreases from about 70° F. to about 20° F. In one embodiment, the COR of the golf ball increases by about 7 percent or more with a corresponding temperature decrease of about 15° F. or greater. In another embodiment, the COR of the golf ball increases by about 15 percent or more with a corresponding temperature decrease of about 30° F. or greater. In still another embodiment of the invention, the tan δ of the component decreases by about 40 percent or greater when the temperature decreases by about 20° F. or more.

In this aspect of the invention, the trifunctional component may be selected from the group consisting of an isocyanurate trimer of hexamethylene diisocyanate, an isocyanurate trimer of toluene diisocyanate, an isocyanurate trimer of isophorone diisocyanate, a blend of isophorone diisocyanate and an isocyanurate trimer of isophorone diisocyanate, and mixtures thereof.

The invention further relates to a chemical composition for golf balls including a polyurea prepolymer, which includes an isocyanate and an amine-terminated compound, and a curing agent, wherein at least one of the isocyanate, amine-terminated compound, or curing agent includes three functional groups. The composition may include at least one of a trifunctional isocyanate, a trifunctional polyol, a trifunctional amine-terminated component, a trifunctional hydroxy-terminated curing agent, a trifunctional amine-terminated curing agent, a trifunctional isocyanurate, or combinations thereof. In one embodiment, the composition includes an isocyanurate trimer of an isocyanate.

In one embodiment, the composition has a COR profile that exhibits an increase as temperature decreases from about 70° F. to about 20° F. In another embodiment, the composition has a tan δ profile that exhibits a decrease as temperature decreases from about 70° F. to about 20° F.

In this aspect of the invention, the composition may consist of linkages having the general formula:

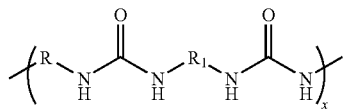

wherein x is the chain length, wherein $R_1$ includes a straight chain or branched hydrocarbon chain having about 1 to about 20 carbons, a polyether chain, a polyester chain, a polycaprolactone chain, or polycarbonate chain, and wherein R includes aliphatic, aromatic, or araaliphatic hydrocarbons.

The invention also relates to a chemical composition for golf balls including a polyurethane prepolymer, which includes an isocyanate and a polyol, and a curing agent, wherein at least one of the isocyanate, polyol, or curing agent includes three functional groups. In one embodiment, the composition includes at least one trifunctional component selected from the group consisting of a trifunctional isocyanate, a trifunctional polyol, a trifunctional amine-terminated component, a trifunctional hydroxy-terminated curing agent, a trifunctional amine-terminated curing agent, a trifunctional isocyanurate, and combinations thereof. The isocyanate may be selected from the group consisting of an isocyanurate trimer of hexamethylene diisocyanate, an isocyanurate trimer of toluene diisocyanate, an isocyanurate trimer of isophorone diisocyanate, a blend of isophorone diisocyanate and an isocyanurate trimer of isophorone diisocyanate, and mixtures thereof.

The polyol may have the following structure:

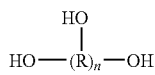

wherein R is polyether-based, polyester-based, polycaprolactone-based, or polycarbonate-based, and wherein n is 1 or greater. In one embodiment, the polyol includes a low equivalent weight liquid polycaprolactone triol. In another embodiment, the curing agent includes hydroxyl functional groups, amine functional groups, or combinations thereof. In yet another embodiment, the curing agent has three functional groups. The curing agent may be selected from the group consisting of propylene-oxide based triamine, ethylene oxide triamine, diethylene triamine, trimethylolpropane-based triamine, glycerin-based triamine, N-(2-aminoethyl)-1,3-propylenediamine, and mixtures thereof.

In this aspect of the invention, the composition preferably has at least one of a COR profile that exhibits an increase as temperature decreases from about 70° F. to about 20° F., a tan δ profile that exhibits a decrease as temperature decreases from about 70° F. to about 20° F.

The invention is further directed to a golf ball including a core and a cover, wherein at least one layer includes a composition including at least one trifunctional material, wherein the composition has a crosslink density of about 0.2 or greater, preferably about 0.5 or greater, more preferably about 0.8 or greater. In one embodiment, the at least one trifunctional material is selected from the group consisting of a trifunctional isocyanate, a trifunctional polyol, a trifunctional amine-terminated component, a trifunctional hydroxy-terminated curing agent, a trifunctional amine-terminated curing agent, a trifunctional isocyanurate, and combinations thereof.

In this aspect of the invention, the composition may include at least one polyurea prepolymer and at least one curing agent. In one embodiment, the polyurea prepolymer includes the at least one trifunctional material. In another embodiment, the curing agent includes the at least one trifunctional material. Alternatively, the composition may include at least one polyurethane prepolymer and at least one curing agent.

The present invention further relates to a golf ball including a core, an inner cover layer, and an outer cover layer, wherein the outer cover layer is formed of a composition including a polyurea prepolymer, which is formed from the reaction product of an isocyanate and an amine-terminated compound, and a curing agent, wherein at least one of the isocyanate, amine-terminated compound, or curing agent has three functional groups, and wherein the composition has a crosslink density of about 0.2 or greater, preferably about 0.5 or greater, and more preferably about 0.8 or greater.

In one embodiment, the composition includes linkages having the general formula:

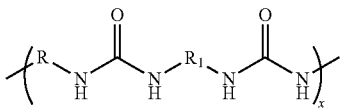

wherein x is the chain length, wherein $R_1$ includes a straight chain or branched hydrocarbon chain having about 1 to about 20 carbons, a polyether chain, a polyester chain, a polycaprolactone chain, or polycarbonate chain, and wherein R includes aliphatic, aromatic, or araaliphatic hydrocarbons. In another embodiment, the composition includes only linkages having the general formula:

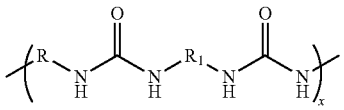

wherein x is the chain length, wherein $R_1$ includes a straight chain or branched hydrocarbon chain having about 1 to about 20 carbons, a polyether chain, a polyester chain, a polycaprolactone chain, or polycarbonate chain, and wherein R includes aliphatic, aromatic, or araaliphatic hydrocarbons.

The composition may include at least one of a trifunctional isocyanate, a trifunctional polyol, a trifunctional amine-terminated component, a trifunctional hydroxy-terminated curing agent, a trifunctional amine-terminated curing agent, a trifunctional isocyanurate, or combinations thereof.

The invention is also directed to a chemical composition for golf balls including a polyurethane prepolymer, which is formed from the reaction product of an isocyanate and a polyol, and a curing agent, wherein at least one of the isocyanate, polyol, or curing agent includes three functional groups, and wherein the composition has an average molecular weight between crosslinks of about 3000 or greater, preferably about 4000 or greater.

In this aspect of the invention, the composition may include at least one trifunctional component selected from the group consisting of a trifunctional isocyanate, a trifunctional polyol, a trifunctional amine-terminated component, a trifunctional hydroxy-terminated curing agent, a trifunctional amine-terminated curing agent, a trifunctional isocyanurate, and combinations thereof.

In one embodiment, the isocyanate is selected from the group consisting of an isocyanurate trimer of hexamethylene diisocyanate, an isocyanurate trimer of toluene diisocyanate, an isocyanurate trimer of isophorone diisocyanate, a blend of isophorone diisocyanate and an isocyanurate trimer of isophorone diisocyanate, and mixtures thereof.

In another embodiment, the composition has at least one of a COR profile that exhibits an increase as temperature decreases from about 70° F. to about 20° F., a tan δ profile that exhibits a decrease as temperature decreases from about 70° F. to about 20° F., or both.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
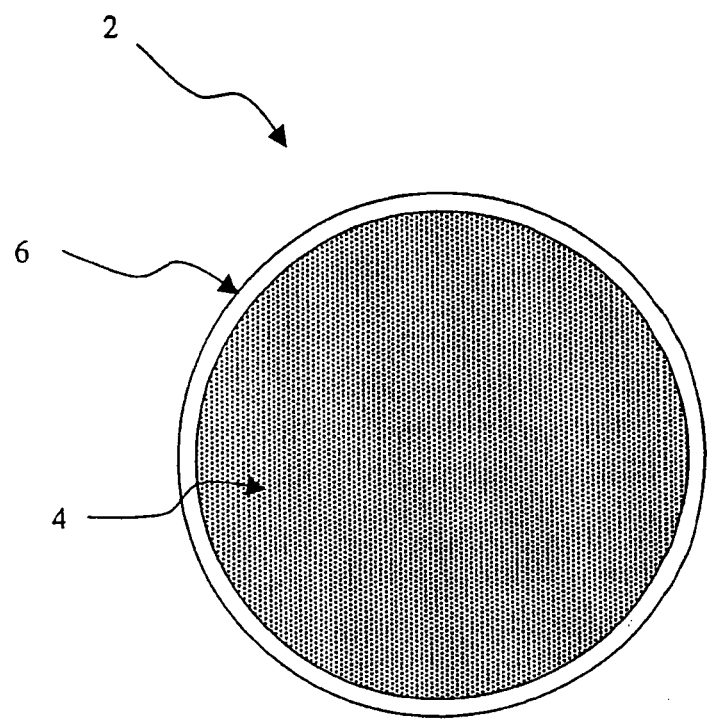
FIG. 1 is a cross-sectional view of a two layer ball, wherein at least a portion of the golf ball is formed from the compositions of the invention.

The present invention contemplates compositions for golf balls and golf clubs that overcome temperature-related problems associated with ball and club components formed from known compositions. In particular, the compositions of the invention are formed using at least one trifunctional material that increases the crosslinking density of the elastomer, which, in turn, improves the heat resistance of the composition and any golf components formed therefrom. In addition, the use of at least one trifunctional material in the compositions of the invention results in improved resiliency of the golf components at non-optimal temperatures. For the purposes of the present invention, non-optimal temperatures are below about 70° F. and above about 95° F. In one embodiment, non-optimal temperatures are those temperatures outside of the about 59° F. to about 95° F. range.

For example, the compositions of the invention may be polyurethane- and/or polyurea-based, formed with a trifunctional diisocyanate, polyol, and/or amine. In particular, the compositions of the invention may include at least one of a trifunctional diisocyanate, a trifunctional polyol, a trifunctional amine-terminated component, a trifunctional hydroxy-terminated curing agent, a trifunctional amine-terminated curing agent, a trifunctional isocyanurate, or combinations thereof.

The compositions of the invention may be aromatic, aromatic-aliphatic, or aliphatic, which provide varying degrees of light stability. Along a continuum, an aromatic composition is less light stable than an aromatic-aliphatic composition, which is less light stable than an aliphatic composition. For example, an aliphatic composition made according to the invention includes only saturated components, i.e., components substantially free of unsaturated carbon-carbon bonds or aromatic groups, which prevent yellowing over time. The term "saturated," as used herein, refers to compositions having saturated aliphatic and alicyclic polymer backbones, i.e., with no carbon-carbon double bonds. Aromatic-aliphatic compositions according to the invention may include both saturated and unsaturated components, whereas aromatic compositions include only unsaturated components. It is important to note, however, that aromatic compositions made according to the invention may include light stabilizers to improve light stability. Thus, light stability may be accomplished in a variety of ways for the purposes of this application.

Furthermore, the compositions of the invention may be used in a variety of golf ball constructions, e.g., one-piece, two-piece, or multilayer balls, as well as golf club components, e.g., club head inserts. When used to form various golf ball components, e.g., golf ball covers, the compositions of the invention produce golf balls with improved physical and aerodynamic properties as compared to golf balls incorporating conventional materials when played in non-optimal temperature conditions. Furthermore, when the compositions of the invention are formed using saturated components, the light stability of such compositions (and golf components formed therefrom) is improved over those compositions formed with traditional aromatic castable compositions.

Compositions of the Invention

As briefly mentioned above, the compositions of the invention include at least one trifunctional material to improve the crosslink density of the compositions and components formed therefrom. The increased crosslink density provides a composition with greater dimensional stability, higher mechanical strength, and improved heat resistance.

In addition to improved heat resistance and dimensional stability, the compositions of the invention have improved resiliency at non-optimal temperatures, i.e., temperatures below about 70° F. and greater than about 95° F. As such, the compositions of the invention preferably have a glass transition temperature ($T_g$) lower than conventional golf component compositions. The specific nature of this improvement will be discussed in greater detail below, however, without being bound by any particular theory, a higher molecular weight between crosslinks is believed to lead to a lower glass transition temperature because of the increased flexibility in the individual polymer chains.

As used herein, the glass transition temperature refers to the temperature at which, when cooling a polymer from a molten state, the mechanical properties of the polymer change from those of a rubber (elastic) to those of a glass (brittle). Rubber elastomers like polyisoprene and polyisobutylene, are used above their $T_g$'s, i.e., in the rubbery state, where they are soft and flexible. As such, a golf ball component formed from these rubbery elastomers will have a hard feel and lose resiliency as the temperature approaches the $T_g$. Therefore, in one aspect of the invention, the compositions of the invention have a $T_g$ that is at least about 5 percent lower than a conventional composition that does not include a trifunctional material. In another embodiment, the $T_g$ is at least about 8 percent lower, preferably at least about 10 percent lower than the $T_g$ of a composition that does not include a trifunctional material.

According to one aspect of the present invention, the compositions of the invention, which include at least one trifunctional material, are based on polyurethane and/or polyurea linkages. The polyurethane linkage may be formed with at least one isocyanate and at least one polyol, whereas the polyurea linkage is formed from at least one isocyanate and at least one amine-terminated curing agent. The linkages are cured with at least one curing agent, preferably a hydroxy-terminated curing agent and/or an amine-terminated curing agent. Thus, at least one of the isocyanate, polyol, amine-terminated compound, or curing agent is trifunctional.

Trifunctional Materials

Any trifunctional material is contemplated for incorporation into the compositions of the invention. As used herein, a "trifunctional material" refers to a material that has the theoretical functionality of three (f=3). Because functionality refers to the number of reactive groups attached to the molecule, a trifunctional material according to the invention has three reactive groups.

By way of example, the functionality on a polyol is the hydroxyl (OH) group, which usually ranges from about two, to more than about six. Theoretically, a trifunctional polyol has three reactive hydroxyl groups and, thus, a functionality of three (f=3), however, not every molecule contains the maximum of reactive groups it theoretically could have. As an example, the trifunctional polyol contains some amount of difunctional (f=2) molecules and monofunctional (f=1) molecules. Therefore, the actual functionality of a trifunctional material according to the present invention may be less than three. The present invention contemplates materials having a theoretical functionality of three, as well as those materials having an actual functionality of less than three.

In one embodiment, the trifunctional material according to the present invention may be at least one of a trifunctional isocyanate, a trifunctional polyol, a trifunctional amine-terminated component, a trifunctional hydroxy-terminated curing agent, a trifunctional amine-terminated curing agent, a trifunctional isocyanurate, and combinations thereof.

A trifunctional isocyanate according to the present invention may be represented by the following generic structure:

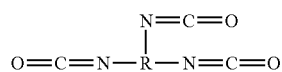

where R may be cyclic, aromatic, aliphatic, linear, branched, isocyanurate, biuret, triisocyanate, or substituted hydrocarbon moiety including from about 1 to about 20 carbon atoms, e.g., arylenes, araalkylenes, or cycloalkylenes. When multiple cyclic or aromatic groups are present, linear, branched, or substituted hydrocarbon groups containing from about 1 to about 10 carbon atoms may be present as spacers between such cyclic or aromatic groups. In some cases, the cyclic or aromatic groups may be substituted at the 2-(ortho), 3-(meta), and/or 4-(para) positions. Substituted groups may include, but are not limited to, halogens, cyano groups, amine groups, silyl groups, hydroxyl groups, acid groups, alkoxy groups, primary or secondary or tertiary hydrocarbon groups, or a combination of two or more groups thereof.

Commercially-available trifunctional isocyanates and isocyanurate trimers of any isocyanate include, but are not limited to, DESDOMUR® N-3300 (isocyanurate trimer of hexamethylene diisocyanate) and DESDOMUR® IL (isocyanurate trimer of toluene diisocyanate), both manufactured by Bayer Corporation, and VESTANAT® T 1890 (isocyanurate trimer of isophorone diisocyanate) and VESTANAT® T 6040 (blend of isophorone diisocyanate and isocyanurate trimer of isophorone diisocyanate), both manufactured by Degussa Corporation. In addition, biurets of hexamethylene diisocyanate are contemplated for use with the present invention.

A trifunctional polyol may be represented by the following generic structure:

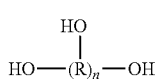

(1)

where R may be polyether-based, polyester-based, polycaprolactone-based, or polycarbonate-based and where n is the chain length, i.e., 1 or greater. For example, a suitable trifunctional polyol for use with the present invention is a low equivalent weight liquid polycaprolactone triol, which is commercially available as TONE® POLYOL 305 from Dow Chemical Company.

A trifunctional amine-terminated component may include those compounds having the following generic structures:

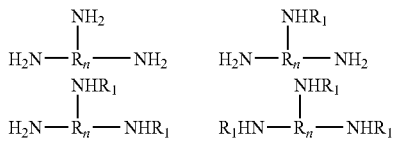

where n is the chain length, i.e., 1 or greater, R may be hydrocarbon-based, polyether-based, polyester-based, polycaprolactone-based, polycarbonate-based, polyamide-based, and $R_1$ may be any branched or linear alkyl group having from about 1 to about 20 carbon atoms, preferably about 1 to about 12 carbon atoms, a phenyl group, a cyclic group, a isopropyl group, a propane nitrile group, or mixture thereof.

For example, the trifunctional amine-terminated component may be a propylene-oxide based triamine. An example of a propylene-oxide based triamine is polyoxypropylene triamine, which is commercially available under the tradename JEFFAMINE® (JEFFAMINE® T-403, T-5000, XTJ-509, manufactured by Huntsman). In addition, ethylene oxide triamine, diethylene triamine, trimethylolpropane-based triamine, glycerin-based triamine, and N-(2-aminoethyl)-1,3-propylenediamine are suitable for use with the present invention.

A trifunctional hydroxy-terminated curing agent for use with the present invention may include compounds having the structures provided above with respect to polyols. In particular, suitable trifunctional hydroxy-terminated curing agents include, but are not limited to, trimethylolpropane (TMP), trimethylolethane, 1,2,4-butanetriol, 1,2,6-hexanetriol, triethanolamine, triisopropanolamine, and mixtures thereof.

A trifunctional amine-terminated curing agent may include any of the structures provided above with respect to the amine-terminated components. For example, suitable trifunctional amine-terminated curing agents include, but are not limited to, ethylene oxide and propylene oxide-based triamines, diethylene triamine, dipropylene triamine, trimethylolpropane-based triamines, glycerin-based triamines, N-(2-aminoethyl)-1,3-propylenediamine, and mixtures thereof.

In addition to the above-referenced trifunctional materials, other suitable materials may increase the crosslink density of the compositions of the invention. For example, some low molecular weight primary diamines may be employed to increase the crosslink density of the compositions of the invention. Suitable primary diamines for use with the present invention include, but are not limited to, 4,4'-diaminodicyclohexylmethane, 3,3'-dimethyl-4,4'-diaminodicyclohexylmethane, polyoxyethylene diamines, polyoxypropylene diamines, (ethylene oxide-capped)-polyoxypropylene diamines, polytetramethylene ether diamines, and mixtures thereof.

Polyurethane Prepolymers

The compositions of the invention may include a polyurethane linkage, where the linkage is a product formed by a reaction between at least one isocyanate and at least one polyol. Specifically, an isocyanate group reacts with the hydroxyl groups of a polyol to form a repeating urethane linkage, which has the following general structure:

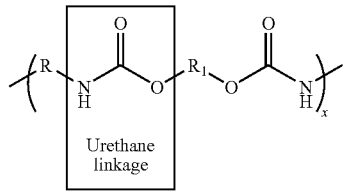

where x is the chain length, i.e., about 1 or greater, where $R_1$ is a straight chain or branched hydrocarbon chain, polyether chain, polyester chain, polycaprolactone chain, or polycarbonate chain having about 1 to about 20 carbons, and where R can be aliphatic, aromatic, or araaliphatic hydrocarbons.

In one embodiment, the composition of the invention includes at least one polyurethane prepolymer, which is the reaction product of at least one isocyanate and at least one polyol, cured with at least one curing agent, wherein any one of the components may be a trifunctional material. In another embodiment, the composition of the invention includes at least one trifunctional material in addition to the at least one isocyanate, at least one polyol, and at least one curing agent, wherein the at least one isocyanate, at least one polyol, and at least one curing agent may or may not be trifunctional materials.

Thus, any of the trifunctional materials discussed above, e.g., the trifunctional isocyanates, biurets, and isocyanurates, trifunctional polyols, trifunctional amine-terminated components, trifunctional hydroxy-terminated curing agents, and trifunctional amine-terminated curing agents are contemplated for use in preparing compositions that include a polyurethane linkage according to the present invention.

The polyurethane compositions may be aliphatic (saturated) and, therefore, in one embodiment, the prepolymer is the product of a reaction between at least one saturated isocyanate and at least one saturated polyol. In another embodiment, at least one of the saturated components is a trifunctional material according to the present invention.

Isocyanates for use with the polyurethane prepolymer include straight or branched aliphatic (saturated) chains, cycloaliphatic, aromatic aliphatic, derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI). As mentioned above, however, the isocyanate is preferably saturated to improve the light stability of the composition of the invention. The isocyanates may be organic polyisocyanate-terminated prepolymers, low free isocyanate prepolymers (discussed in more detail below), and mixtures thereof. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more.

In one embodiment, the isocyanate is any straight or branched aliphatic, cycloaliphatic, or aromatic aliphatic material having three functional (NCO) groups per molecule. For example, the isocyanate may be an isocyanurate trimer of any isocyanate. When used in the polyurethane prepolymers of the invention, an isocyanurate trimer of an isocyanate is preferably included in an amount of about one percent to about 15 percent by weight of the total prepolymer. In one embodiment, the isocyanurate trimer of an isocyanate is present in an amount of about 2 percent to about 13 percent by weight of the total prepolymer, preferably about 3 percent to about 12 percent by weight of the total prepolymer. In another embodiment, the prepolymer includes about 4 percent to about 10 percent of an isocyanurate trimer of an isocyanate.

Thus, in addition to the trifunctional isocyanates discussed earlier, suitable isocyanate-containing components include isocyanates having the generic structure: O=C=N—R—N=C=O, where R is a cyclic, aromatic, aliphatic, linear, branched, or substituted hydrocarbon moiety containing from about 1 to 20 carbon atoms, such as arylenes, aralkylenes, alkylenes, or cycloalkylenes. When multiple cyclic or aromatic groups are present, linear, branched, or substituted hydrocarbons containing from about 1 to 10 carbon atoms can be present as spacers between the cyclic or aromatic groups. In some cases, the cyclic or aromatic group(s) may be substituted at the 2-, 3-, and/or 4-positions, respectively. Substituted groups may include, but are not limited to, halogens, cyano groups, amine groups, silyl groups, hydroxyl groups, acid groups, alkoxy groups, primary, secondary, or tertiary hydrocarbon groups, or a mixture thereof.

Examples of saturated (aliphatic) isocyanates that can be used in the polyurethane prepolymer include, but are not limited to, ethylene diisocyanate; propylene-1,2-diisocyanate; tetramethylene diisocyanate; 1,4-tetramethylene diisocyanate; 1,5-pentamethylene diisocyanate; 2-methyl-1,5-pentamethylene diisocyanate; 1,6-hexamethylene diisocyanate (HDI); HDI biuret prepared from HDI; octamethylene diisocyanate; decamethylene diisocyanate; 2,2,4-trimethylhexamethylene diisocyanate; 2,4,4-trimethylhexamethylene diisocyanate; 1,7-heptamethylene diisocyanate; 1,8-octamethylene diisocyanate; 1,9-novamethylene diisocyanate; 1,10-decamethylene diisocyanate; 1,12-dodecane diisocyanate; 1,3-cyclobutane diisocyanate; 1,2-cyclohexane diisocyanate; 1,3-cyclohexane diisocyanate; 1,4-cyclohexane diisocyanate; methylcyclohexylene diisocyanate (HTDI); 2,4-methylcyclohexane diisocyanate; 2,6-methyl cyclohexane diisocyanate; 4,4'-dicyclohexane diisocyanate; 2,4'-dicyclohexane diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); saturated trimerized isocyanurates, such as isocyanurates of hexamethylene diisocyanate, isocyanurates of isophorone diisocyanate, HDI biurets prepared from HDI, isocyanurates of trimethyl-hexamethylene diisocyanate, and mixtures thereof; uretdione of hexamethylene diisocyanate, and mixtures thereof; modified polyisocyanate derived from the above isocyanates and polyisocyanates; and mixtures thereof.

In one embodiment, the saturated isocyanates include isophorone diisocyanate (IPDI), 4,4'-dicyclohexylmethane diisocyanate ($H_{12}$MDI), 1,6-hexamethylene diisocyanate (HDI), or a combination thereof.

As briefly discussed, aromatic aliphatic isocyanates may also be used to form the polyurethane prepolymer. While use of aromatic aliphatic materials does not confer the same amount of light stability to the resultant product compared to those including purely aliphatic materials, it does provide a greater degree of light stability to the resultant product compared to those formed with purely aromatic materials. Examples of aromatic aliphatic isocyanates include 1,2-, 1,3-, and 1,4-xylene diisocyanate; 1,2-, 1,3-, and 1,4-bis-(sec-butylamino) xylene; meta-tetramethylxylene diisocyanate (m-TMXDI); para-tetramethylxylene diisocyanate (p-TMXDI); a modified polyisocyanate derived from the above isocyanates and polyisocyanates; and mixtures thereof. In addition, the aromatic aliphatic isocyanates may be mixed with any of the saturated isocyanates listed above for the purposes of this invention.

Unsaturated isocyanates, i.e., aromatic compounds, may also be used with the present invention, although the use of unsaturated compounds in the prepolymer is preferably coupled with the use of a light stabilizer or pigment as discussed below. Examples of unsaturated diisocyanates include, but are not limited to, substituted and isomeric mixtures including 2,2'-, 2,4'-, and 4,4'-diphenylmethane diisocyanate (MDI); 2,2'-, 2,4'-, and 4,4'-biphenylene diisocyanate; 3,3'-dimethyl-4,4'-biphenyl diisocyanate (TODI); 3,3'-dimethyl-4,4'-diphenylmethane diisocyanate; toluene diisocyanate (TDI); polymeric MDI (PMDI, a brown liquid composed of approximately 50% methylene diisocyanate with the remainder comprised of oligomers of MDI); carbodimide-modified liquid 4,4'-diphenylmethane diisocyanate; para-phenylene diisocyanate (PPDI); meta-phenylene diisocyanate (MPDI); ortho-phenylene diisocyanate; 4-chloro-1,3-phenylene diisocyanate; triphenylmethane-4,4'-, and triphenylmethane-4,4"-triisocyanate; 1,5-naphthalene diisocyanate (NDI); 1,5-tetrahydronaphthalene diisocyanate; anthracene diisocyanate; tetracene diisocyanate; dimerized uretdiones of any diisocyanate or polyisocyanate, such as uretdione of toluene diisocyanate, uretdione of diphenylmethane diisocyanate, and mixtures thereof; unsaturated trimerized isocyanurates, such as trimers of diphenylmethane diisocyanate, trimers of tetramethylxylene diisocyanate, isocyanurates of toluene diisocyanate, and mixtures thereof; monomeric triisocyanates such as 2,4,4'-diphenylene triisocyanate, 2,4,4'-diphenylmethane triisocyanate, 4,4',4"-triphenylmethane triisocyanate, and mixtures thereof; and mixtures thereof.

Suitable polyols for use in the polyurethane prepolymer may be linear or branched organic, modified organic, saturated, aliphatic, alicyclic, unsaturated, araliphatic, aromatic, substituted, or unsubstituted compounds. The polyol preferably has two or more reactive hydroxy groups per molecule, such as primary or secondary hydroxyl groups, and at least one cyclic, aromatic, aliphatic, linear, branched, or substituted hydrocarbon moiety containing from 1 to about 20 carbon atoms, such as arylenes, aralkylenes, alkylenes, or cycloalkylenes. When the polyol is a trifunctional material, it has three reactive hydrogen groups per molecule. Any of the trifunctional polyols discussed earlier are suitable for use in this context.

When multiple cyclic or aromatic groups are present, linear, branched or substituted hydrocarbons containing from 1 to about 10 carbon atoms can be present as spacers between such cyclic or aromatic groups. In some cases, the cyclic or aromatic group(s) may be substituted at the 2-(ortho-), 3-(meta-), and/or 4-(para-) positions. Substituted groups may include, but are not limited to, halogens, cyano groups, amine groups, silyl groups, hydroxyl groups, acid groups, alkoxy groups, primary, secondary, or tertiary hydrocarbon groups, dimerate alcohols, or a combination of two or more groups thereof. Any and all of the polyols disclosed herein may be used alone or in combination of two or more thereof.

Thus, polyols for use with the present invention include, but are not limited to, hydroxy-terminated polyethers, hydroxy-terminated polyesters, hydroxy-terminated polycaprolactones, hydroxy-terminated polycarbonates, hydroxy-terminated polyhydrocarbons, hydroxy-terminated acid functional oligomers or polymers (or ionomers thereof derived from partial or full neutralization with organic or inorganic cations), and the like. The polyols for use with the present invention preferably have a molecular weight of about 200 or greater.

Examples of hydroxy-terminated polyethers include, but are not limited to polytetramethylene ether glycol ("PTMEG"); low-molecular-weight PTMEG; modified PTMEG; hydroxy-terminated copolymer of polytetrahydrofuran and polymethyltetrahydrofuran ("PTG-L"); poly(oxyethylene)glycol; poly(oxypropylene)glycol; (ethylene oxide)-capped poly(oxypropylene) ether glycol; poly(oxyethylene-co-oxypropylene) glycol; and mixtures thereof.

Suitable hydroxy-terminated polyesters include, but are not limited to, poly(ethylene adipate) glycol; poly(butylene adipate) glycol; poly(hexamethylene adipate) glycol; poly(ethylene propylene adipate) glycol; poly(ethylene butylene adipate) glycol; poly(hexamethylene butylene adipate) glycol; (o-phthalate-1,6-hexanediol)-based polyester polyol; poly(ethylene terephthalate)-based polyester polyol, and mixtures thereof.

Suitable hydroxy-terminated polycaprolactones include, but are not limited to, (alkylene oxide)-initiated polycaprolactones; (ethylene glycol)-initiated polycaprolactone; (diethylene glycol)-initiated polycaprolactone; (propylene glycol)-initiated polycaprolactone; (dipropylene glycol)-initiated polycaprolactone; 1,4-butanediol-initiated polycaprolactone; trimethylolpropane-initiated polycaprolactone; (neopentyl glycol)-initiated polycaprolactone; 1,6-hexanediol-initiated polycaprolactone; PTMEG-initiated polycaprolactone; 2-ethyl-2-(hydroxymethyl)-1,3-propanediol initiated polycaprolactone; and mixtures thereof.

Examples of suitable hydroxy-terminated polycarbonates include, but are not limited to poly(phthalate carbonate) glycol; poly(hexamethylene carbonate) glycol; poly(1,4-cyclohexanedimethylene carbonate) glycol; (bisphenol A)-based polycarbonate glycols; and mixtures thereof.

Non limiting examples of hydroxy-terminated polyhydrocarbons include polyisoprene polyol (a.k.a. liquid isoprene rubber); poly(hydrogenated isoprene) polyol; polybutadiene polyol; poly(hydrogenated butadiene) polyol; and mixtures thereof.

Hydroxy-terminated acid functional oligomers or polymers that may be used with the present invention include, but are not limited to, the acid functional polyols as disclosed in U.S. Pat. No. 6,207,784, which is incorporated in its entirety by reference herein. Other hydroxy-terminated polyols may be used with the present invention, such as hydroxy-terminated polyolefins; hydroxy-terminated polyamides; glycerol-based polyols; (castor oil)-based polyols; hydroxy-terminated alkylene-styrene copolymers (a.k.a. Kraton® polyols); and hydroxy-terminated acrylic polyols.

Saturated members of the above-listed hydroxy-terminated polyols are preferred for use in the present invention, because they afford superior light stability when incorporated into the golf ball compositions of the invention. Saturated hydroxy-terminated polyols may be aliphatic, alicyclic, or fully hydrogenated. Exemplary saturated hydroxy-terminated polyols include, but are not limited to, PTMEG; low-molecular-weight PTMEG; modified PTMEG; PTG-L; poly(oxyethylene)glycol; poly(oxypropylene)glycol; (ethylene oxide)-capped poly(oxypropylene) ether glycol; poly(ethylene adipate) glycol; poly(butylene adipate) glycol; poly(hexamethylene adipate) glycol; poly(ethylene propylene adipate) glycol; poly(ethylene butylene adipate) glycol; poly(hexamethylene butylene adipate) glycol; (alkylene oxide)-initiated polycaprolactones; (ethylene glycol)-initiated polycaprolactone; (diethylene glycol)-initiated polycaprolactone; (propylene glycol)-initiated polycaprolactone; (dipropylene glycol)-initiated polycaprolactone; 1,4-butanediol-initiated polycaprolactone; trimethylolpropane-initiated polycaprolactone; (neopentyl glycol)-initiated polycaprolactone; 1,6-hexanediol-initiated polycaprolactone; PTMEG-initiated polycaprolactone; poly(hexamethylene carbonate) glycol; saturated poly(hydrogenated isoprene) polyol; saturated poly(hydrogenated butadiene) polyol; saturated dimerate or trimerate polyols of fatty acids or isostearic acid; saturated hydroxy-terminated polyolefins; saturated hydroxy-terminated polyamides; saturated glycerol-based polyols; saturated (castor oil)-based polyols; and saturated hydroxy-terminated alkylene-styrene copolymers. In one embodiment, the saturated polyol has three reactive hydrogen groups per molecule.

In another aspect of the present invention, the polyol is based on a hydrophobic backbone. By using polyols based on a hydrophobic backbone, the polyurethane prepolymers of the invention may be more water resistant than those polyurethane prepolymers having polyols without a hydrophobic backbone. Some non-limiting examples of polyols based on a hydrophobic backbone include hydrocarbon polyols, hydroxy-terminated polybutadiene polyols, polyethers, polycaprolactones, and polyesters. In one embodiment, the polyol based on a hydrophobic backbone has three reactive hydrogen groups per molecule.

The isocyanates suitable for use with the present invention may have any amount of NCO. As used herein, "percent NCO" refers to the percent by weight of free, reactive, and unreacted isocyanate functional groups in an isocyanate-functional molecule or material. The percent NCO is calculated as follows: the total atomic weight of all the NCO groups in the molecule or material is divided by its total molecular weight and multiplied by 100.

When formed, polyurethane prepolymers preferably contain about 10 percent to about 25 percent by weight of the prepolymer of free isocyanate monomer (unreacted NCO groups), preferably about 10 percent to about 20 percent by weight. The number of unreacted NCO groups in the polyurethane prepolymer may be varied to control such factors as the speed of the reaction, the resultant hardness of the composition, and the like. For example, as the weight percent of unreacted isocyanate groups increases, the hardness also increases in a somewhat linear fashion.

In another embodiment, the percent of unreacted NCO groups in the polyurethane prepolymer of isocyanate and polyol may be less than about 14 percent. For example, the polyurethane prepolymer may have from about 5 percent to about 11 percent unreacted NCO groups, and even more preferably, from about 6 to about 9.5 percent unreacted NCO groups. In one embodiment, the percentage of unreacted NCO groups in the prepolymer is about 3 percent to about 9 percent. Alternatively, the percentage of unreacted NCO groups may be about 7.5 percent or less, and more preferably, about 7 percent or less. In another embodiment, the unreacted NCO content in the prepolymer is from about 2.5 percent to about 7.5 percent, and more preferably from about 4 percent to about 6.5 percent.

In an alternative embodiment, the polyurethane prepolymer may be stripped of the free isocyanate monomer, i.e., a low free isocyanate monomer. For example, after stripping, the prepolymer may contain about 1 percent or less free isocyanate monomer. In another embodiment, the prepolymer contains about 0.5 percent by weight or less of free isocyanate monomer.

Polyurea Prepolymers

The compositions of the invention may also be based on a polyurea linkages, where the prepolymer is a product formed by a reaction between at least one isocyanate and at least one amine-terminated compound and then cured with a curing agent. In accordance with the present invention, at least one of the polyurea prepolymer components, i.e., the isocyanate or the amine-terminated compound, or the curing agent may be a trifunctional material, i.e., having three functional groups per molecule. In another embodiment, the trifunctional material may be included in the polyurea-based composition in addition to the polyurea prepolymer and curing agent. In yet another embodiment, the polyurea composition may include at least one isocyanate, amine-terminated compound, and an amine-terminated curing agent, wherein any or all may be trifunctional materials, and also include at least one additional trifunctional material.

The polyurea compositions may be saturated and, therefore, in one embodiment, the polyurea composition is the product of a reaction between at least one saturated polyurea prepolymer, i.e., at least one saturated isocyanate and at least one saturated polyamine, which is then cured with at least one saturated amine-terminated curing agent. At least one of the saturated components is preferably a trifunctional material according to the present invention.

For the purposes of the present invention, the polyurea-based compositions include primarily urea linkages having the following general structure:

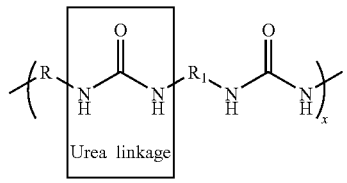

where x is the chain length, i.e., about 1 or greater, where $R_1$ is a straight chain or branched hydrocarbon chain, polyether chain, polyester chain, polycaprolactone chain, or polycarbonate chain having about 1 to about 20 carbons, and where R can be aliphatic, aromatic, or araaliphatic hydrocarbons.

The main difference between the polyurethane prepolymers discussed above and the polyurea prepolymers discussed in this section is the substitution of the polyol component with an amine-terminated compound. Therefore, the isocyanates suitable for inclusion in the polyurea prepolymer are the same as those listed above with respect to the polyurethane prepolymer, which are incorporated by reference here. And, as above, while saturated isocyanates may be used, aromatic aliphatic isocyanates and aromatic isocyanates are contemplated for use with the present invention. In addition, the isocyanate may be a trifunctional material according to the present invention.

It should be understood, however, that a composition including primarily urea linkages may have distinctly different properties than a composition including primarily urethane linkages due to the substitution of the polyol with the amine-terminated compound. For example, a polyurea prepolymer used according to the present invention may provide different shear, cut, resiliency, and adhesion properties to the resultant elastomer as compared to an elastomer formed with a polyurethane prepolymer.

In addition to the trifunctional amine-terminated compounds discussed earlier, any amine-terminated compound available to one of ordinary skill in the art is suitable for use in the polyurea prepolymer. For example, the amine-terminated compound may include amine-terminated hydrocarbons, amine-terminated polyethers, amine-terminated polyesters, amine-terminated polycarbonates, amine-terminated polycaprolactones, amine-terminated polyamides, and mixtures thereof. The amine-terminated compounds may be in the form of a primary amine ($NH_2$), a secondary amine (NHR), or mixtures thereof. Co-pending U.S. patent application Ser. No. 10/409,144, filed Apr. 9, 2003, entitled "Polyurea and Polyurethane Compositions for Golf Equipment," which is incorporated by reference herein, discloses suitable, but nonlimiting, amine-terminated compounds for use with the present invention.

The molecular weight of the amine-terminated compounds for use in the invention may range from about 100 to about 10,000. As used herein, the term "about" is used in connection with one or more numbers or numerical ranges, and should be understood to refer to all such numbers, including all numbers in a range. In one embodiment, the amine-terminated compound is about 500 or greater, preferably about 1000 or greater, and even more preferably about 2000 or greater. In another embodiment, the amine-terminated compound molecular weight is about 8000 or less, preferably about 4,000 or less, and more preferably about 3,000 or less. For example, in one embodiment, the molecular weight of the amine-terminated compound is about 1000 to about 4000. Because lower molecular weight polyether amines, which have faster reaction rates, may be prone to forming solid or gel polyureas, a higher molecular weight oligomer, which has a comparatively slower reaction rate, may be used to avoid solid or gel formation.

In one embodiment, the amine-terminated compound includes amine-terminated hydrocarbons having the following generic structures:

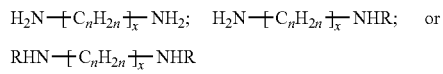

where x is the chain length, i.e., 1 or greater, n is preferably about 1 to about 12, and R is any branched or linear alkyl group having from about 1 to about 20 carbon atoms, preferably about 1 to about 12 carbon atoms, a phenyl group, a cyclic group, an isopropyl group, a propane nitrile group, or mixture thereof.

The amine-terminated compound may also include amine-terminated polyethers having following generic structures:

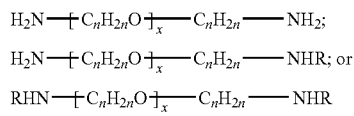

where x is the chain length, i.e., 1 or greater, n is preferably about 1 to about 12, and R is any branched or linear alkyl group having from about 1 to about 20 carbon atoms, preferably about 1 to about 12 carbon atoms, a phenyl group, a cyclic group, an isopropyl group, a propane nitrile group, or mixture thereof. One example of an amine-terminated polyether is a polyether amine. As used herein, "polyether amine" refers to a polyoxyalkyleneamine containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

In one embodiment, the polyether amine has the generic structure:

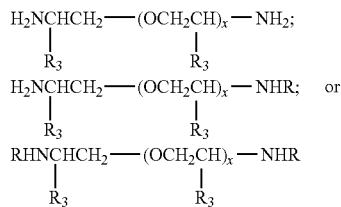

wherein the repeating unit x has a value ranging from about 1 to about 70, R is any branched or linear alkyl group having from about 1 to about 20 carbon atoms, preferably about 1 to about 12 carbon atoms, a phenyl group, a cyclic group, an isopropyl group, a propane nitrile group, or mixture thereof, and $R_3$ is a hydrogen, methyl group, or a mixture thereof.

Even more preferably, the repeating unit may be from about 5 to about 50, and even more preferably is from about 12 to about 35.

In another embodiment, the polyether amine has the generic structure:

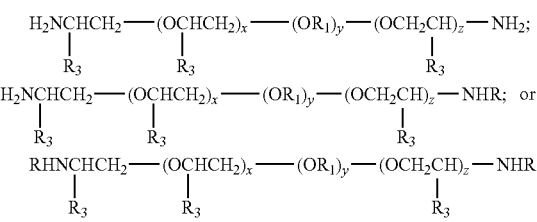

wherein the repeating units x and z have combined values from about 3.6 to about 8 and the repeating unit y has a value ranging from about 9 to about 50, R is any branched or linear alkyl group having from about 1 to about 20 carbon atoms, preferably about 1 to about 12 carbon atoms, a phenyl group, a cyclic group, an isopropyl group, a propane nitrile group, or mixture thereof, $R_1$ is —$(CH_2)_a$—, wherein "a" may be a repeating unit ranging from about 1 to about 10, a phenylene group, a cyclic group, or mixtures thereof, and $R_3$ is a hydrogen, methyl group, or a mixture thereof.

In yet another embodiment, the polyether amine has the generic structure:

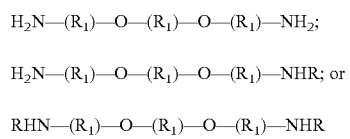

wherein R is any branched or linear alkyl group having from about 1 to about 20 carbon atoms, preferably about 1 to about 12 carbon atoms, a phenyl group, a cyclic group, an isopropyl group, a propane nitrile group, or mixture thereof, and wherein $R_1$ is —$(CH_2)_a$—, wherein "a" may be a repeating unit ranging from about 1 to about 10, a phenylene group, a cyclic group, or mixtures thereof.

Suitable polyether amines include, but are not limited to, methyldiethanolamine; polyoxyalkylenediamines such as, polytetramethylene ether diamines, polyoxypropylenetriamine, polyoxyethylene diamines, and polyoxypropylene diamines; poly(ethylene oxide capped oxypropylene) ether diamines; propylene oxide-based triamines; triethyleneglycoldiamines; trimethylolpropane-based triamines; glycerin-based triamines; and mixtures thereof. In one embodiment, the polyether amine used to form the prepolymer is Jeffamine® D2000 (manufactured by Huntsman Corporation of Austin, Tex.).

The molecular weight of the polyether amine for use in the invention may range from about 100 to about 5000. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 4000, preferably about 1000 to about 4000, and more preferably is between about 1500 to about 2500. Because lower molecular weight polyether amines may be prone to forming solid polyureas during prepolymer preparation, a higher molecular weight oligomer, such as Jeffamine® D2000, is preferred.

In addition, the amine-terminated compound may include amine-terminated polyesters having the generic structures:

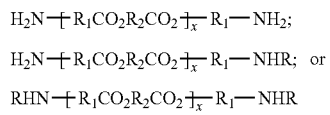

where x is the chain length, i.e., 1 or greater, preferably about 1 to about 20, R is any branched or linear alkyl group having from about 1 to about 20 carbon atoms, preferably about 1 to about 12 carbon atoms, a phenyl group, a cyclic group, an isopropyl group, a propane nitrile group, or mixture thereof, and $R_1$ and $R_2$ are straight or branched hydrocarbon chains, e.g., alkyl or aryl chains.

Copolymers of polycaprolactone and polyamines may also be used to form the polyurea prepolymers of the present invention. These copolymers include, but are not limited to, bis(2-aminoethyl)ether initiated polycaprolactone, 2-(2-aminoethylamino) ethanol, polyoxyethylene diamine initiated polycaprolactone, propylene diamine initiated polycaprolactone, polyoxypropylene diamine initiated polycaprolactone, 1,4-butanediamine initiated polycaprolactone, trimethylolpropane-based triamine initiated polycaprolactone, neopentyl diamine initiated polycaprolactone, hexanediamine initiated polycaprolactone, polytetramethylene ether diamine initiated polycaprolactone, and mixtures thereof. In addition, polycaprolactone polyamines having the following structures may be useful in forming the polyurea prepolymers of the present invention:

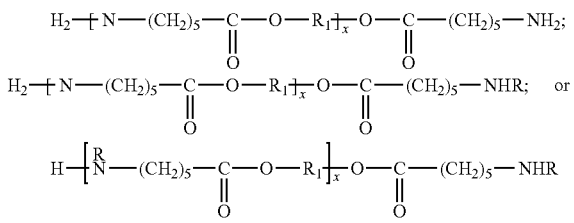

where x is the chain length, i.e., 1 or greater, preferably about 1 to about 20, R is any branched or linear alkyl group having from about 1 to about 20 carbon atoms, preferably about 1 to about 12 carbon atoms, a phenyl group, a cyclic group, an isopropyl group, a propane nitrile group, or mixture thereof, and $R_1$ is a straight or branched hydrocarbon chain including about 1 to about 20 carbons.

Additional polycaprolactone polyols include those having the following generic structure:

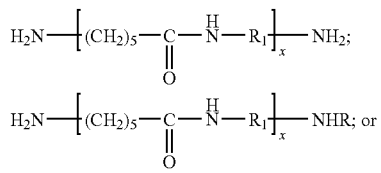

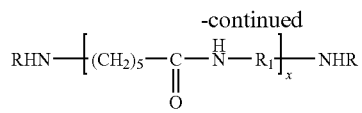

where x is the chain length, i.e., 1 or greater, preferably about 1 to about 20, R is any branched or linear alkyl group having from about 1 to about 20 carbon atoms, preferably about 1 to about 12 carbon atoms, a phenyl group, a cyclic group, an isopropyl group, a propane nitrile group, or mixture thereof, and $R_1$ is a straight or branched hydrocarbon chain including about 1 to about 20 carbons.

In another embodiment, the amine-terminated compound may be an amine-terminated polycarbonate having one of the following generic structures:

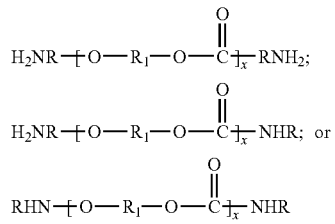

where x is the chain length, which preferably ranges from about 1 to about 20, R is any branched or linear alkyl group having from about 1 to about 20 carbon atoms, preferably about 1 to about 12 carbon atoms, a phenyl group, a cyclic group, an isopropyl group, a propane nitrile group, or mixture thereof, and $R_1$ is a straight chain hydrocarbon or predominantly bisphenol A units or derivatives thereof.

Amine-terminated polyamides may also be reacted with the isocyanate component to form the polyurea prepolymer of the present invention. Suitable amine-terminated polyamides include, but are not limited to, those having following structures:

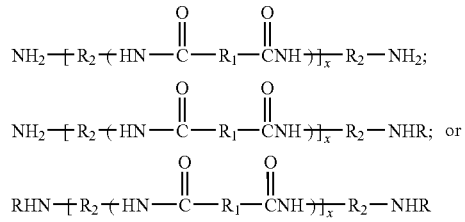

where x is the chain length, i.e., about 1 or greater, R is any branched or linear alkyl group having from about 1 to about 20 carbon atoms, preferably about 1 to about 12 carbon atoms, a phenyl group, a cyclic group, an isopropyl group, a propane nitrile group, or mixture thereof, $R_1$ is a linear or branched alkyl group having about 1 to about 36 carbon atoms, a phenyl group, or a cyclic group, and $R_2$ contains a linear or branched alkyl group having about 1 to about 36 carbon atoms (straight or branched), a phenyl group, a cyclic group, an oxyethylene group, or an oxypropylene group.

Additional amine-terminated compounds that may also be useful in forming the polyurea prepolymers of the present invention include, but are not limited to, poly(acrylonitrileco-butadiene); poly(1,4-butanediol) bis(4-aminobenzoate) in liquid or waxy solid form; linear and branched polyethylenimine; low and high molecular weight polyethylenimine having an average molecular weight of about 500 to about 30,000; poly(propylene glycol) bis(2-aminopropyl ether) having an average molecular weight of about 200 to about 5,000; polytetrahydrofuran bis(3-aminopropyl) terminated having an average molecular weight of about 200 to about 2000; and mixtures thereof, all of which are available from Aldrich of Milwaukee, Wis.

Thus, in one embodiment, the polyurea prepolymer includes a poly(acrylonitrile-co-butadiene) having one of the following structures:

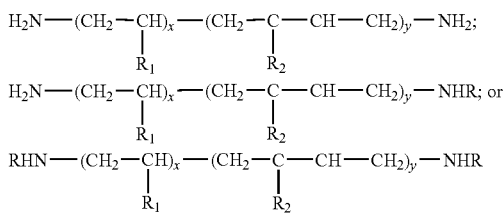

wherein x and y are chain lengths, i.e., greater than about 1, R is any branched or linear alkyl group having from about 1 to about 20 carbon atoms, preferably about 1 to about 12 carbon atoms, a phenyl group, a cyclic group, an isopropyl group, a propane nitrile group, or mixture thereof, $R_1$ is a hydrogen, methyl group, cyano group, phenyl group, or a mixture thereof, and $R_2$ is a hydrogen, a methyl group, chloride, or a mixture thereof. In one embodiment, the y:x ratio is about 82:18 to about 90:10. In other words, the poly(acrylonitrile-co-butadiene) may have from about 10 percent to about 18 percent acrylonitrile by weight.

In another embodiment, the polyurea prepolymer includes a poly(1,4-butanediol) bis(4-aminobenzoate) having one of the following structures:

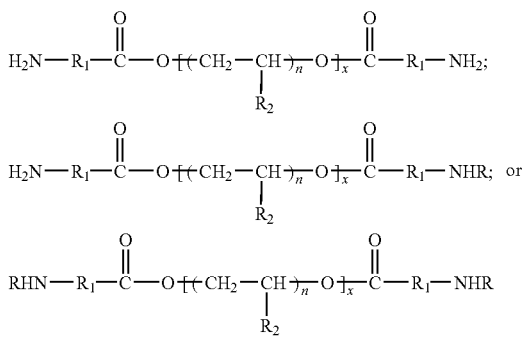

where x and n are chain lengths, i.e., 1 or greater, and n is preferably about 1 to about 12, R is any branched or linear alkyl group having from about 1 to about 20 carbon atoms, preferably about 1 to about 12 carbon atoms, a phenyl group, a cyclic group, an isopropyl group, a propane nitrile group, or mixture thereof, R1 is a linear or branched alkyl group having about 1 to about 36 carbon atoms, a phenyl group, or a cyclic group, and $R_2$ is a hydrogen, a methyl group, or a mixture thereof. In one embodiment, $R_1$ is phenyl, $R_2$ is hydrogen, and n is about 2.

In yet another embodiment, the polyurea prepolymer includes at least one linear or branched polyethyleneimine having one of the following structures:

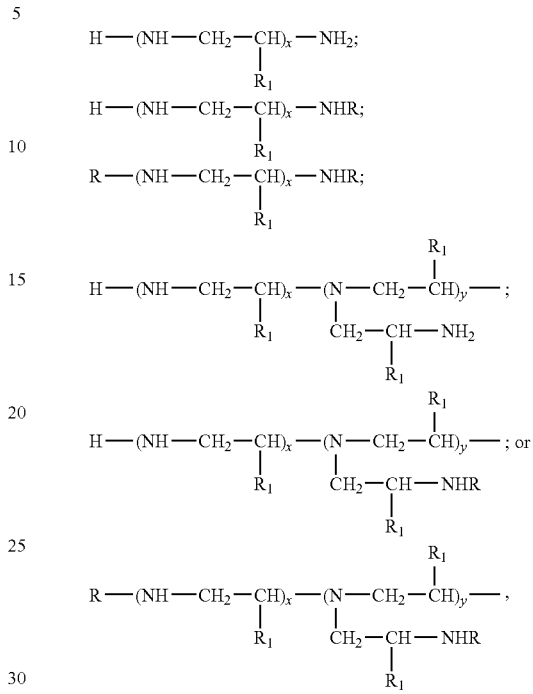

wherein x and y are chain lengths, i.e., greater than about 1, R is any branched or linear alkyl group having from about 1 to about 20 carbon atoms, preferably about 1 to about 12 carbon atoms, a phenyl group, a cyclic group, an isopropyl group, a propane nitrile group, or mixture thereof, and $R_1$ is a hydrogen, methyl group, or a mixture thereof. In one embodiment, $R_1$ is hydrogen. In another embodiment, the polyurea composition includes a mixture of linear and branched polyethyleneimines.

In still another embodiment, the polyurea prepolymer of the present invention includes a polytetrahydrofuran bis(3-aminopropyl) terminated compound having one of the following structures:

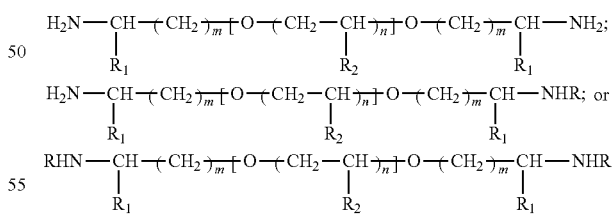

where m and n are chain lengths, i.e., 1 or greater, n is preferably about 1 to about 12 and m is preferably about 1 to about 6, R is any branched or linear alkyl group having from about 1 to about 20 carbon atoms, preferably about 1 to about 12 carbon atoms, a phenyl group, a cyclic group, an isopropyl group, a propane nitrile group, or mixture thereof, and $R_1$ and $R_2$ are hydrogen, methyl groups, or mixtures thereof. In one embodiment, both $R_1$ and $R_2$ are hydrogen and both m and n are about 2.

By using amine-terminated compounds based on a hydrophobic prepolymer, the polyurea prepolymers may provide more water resistance than those polyurea prepolymers formed with an amine-terminated hydrophilic prepolymer. Thus, in one embodiment, the amine-terminated compound includes hydrophobic backbone, e.g., an unsaturated or saturated hydrocarbon-based primary or secondary amine-terminated compound. One example of an amine-terminated hydrocarbon is an amine-terminated polybutadiene. In another embodiment, the amine-terminated compound includes a hydrophobic backbone, and has three functional groups on the molecule.

It is important to note that many amine-terminated compounds may be unsuitable for reaction with the isocyanate because of the rapid reaction between the two components. In general, the reaction rate of an alicyclic isocyanate and an alicyclic primary or secondary amine is very fast. In one embodiment, however, a hindered secondary diamine may be suitable for use in the prepolymer. Without being bound to any particular theory, it is believed that an amine with a high level of stearic hindrance, e.g., a secondary butyl group on the nitrogen atom, has a slower reaction rate than an amine with no hindrance or a low level of hindrance. For example, 4,4'-bis-(sec-butylamino)-dicyclohexylmethane (Clearlink® 1000); 3,3'-dimethyl-4,4'-bis-(sec-butylamino)-dicyclohexylmethane (Clearlink® 3000); 4,4'-bis-(butylamino)-dicyclohexylmethane; 3,3'-dimethyl-4,4'-bis-(butylamino)-dicyclohexylmethane; 1,4-bis-(sec-butylamino)-cyclohexane; 1,2-bis-(sec-butylamino)-cyclohexane; N,N'-dialkylaminodicyclohexylmethane; N,N'-diethylmaleate-2-methyl-pentamethylene diamine (Desmophen® NH 1220); N,N'-di(ethylmaleate-amino)-dicyclohexylmethane (Desmophen® NH 1420); N,N'-di(ethylmaleate-amino)-dimethyl-dicyclohexylmethane (Desmophen® NH 1520); 1,2-, 1,3-, and 1,4-bis-(sec-butylamino) xylene; 1,2-, 1,3-, and 1,4-bis-(sec-butylamino methyl)cyclohexane; 3-{[(5-amino-1,3,3-trimethylcyclohexyl)methyl]amino}-propane nitrile; and mixtures thereof may be suitable for use in combination with an isocyanate to form prepolymers according to the invention.

In addition, the use of decelerants, such as aminoalcohols or cyclic carbonates may be use in the compositions of the invention to reduce the speed of reaction between specific isocyanates and amine-terminated compounds. Suitable aminoalcohols for use with the present invention include, but are not limited to, monoethanolamine, monoisopropanolamine, diethanolamine, diisopropanolamine, and mixtures thereof. In addition, alicyclic carbonates, such as ethylene carbonate, propylene carbonate, butylene carbonate, and mixtures thereof, can be used to slow down the reaction. However, once a decelerant is included in the polyurea prepolymer, urethane linkages may be formed from excess isocyanate and hydroxyl groups in the decelerant (depending on the type of decelerant used). As such, the prepolymer is no longer a pure polyurea prepolymer, but instead a prepolymer including both urea and a small amount of urethane linkages. Such a prepolymer is distinct from a polyurea prepolymer including only an isocyanate and an amine-terminated compound or a polyurethane prepolymer including only an isocyanate and a polyol. For the sake of clarity, this type of prepolymer will be referred to as a polyurea-polyurethane prepolymer throughout the application.

Likewise, while the amine-terminated compound may also be blended with additional polyols (as discussed above with respect to the polyurethane prepolymers), once a polyol is included in the polyurea prepolymer, urethane linkages may be formed, which would result in a polyurea-polyurethane prepolymer as discussed above.

Curing Agents

The prepolymers of the present invention may be cured by crosslinking the prepolymers with a single curing agent or a blend of curing agents. Because the compositions of the invention may be castable thermoset or thermoplastic in nature, the prepolymer to curative ratio is important. For example, castable thermoplastic compositions of the invention include linear polymers and are typically formed from curing the prepolymer with a diol or secondary diamine with 1:1 stoichiometry in the absence of moisture. Thermoset compositions of the invention, on the other hand, are crosslinked polymers and are typically produced from the reaction of an isocyanate and a polyol or polyamine cured with a primary diamine or polyfunctional glycol.

Skilled artisans are aware that the various properties of the golf ball and golf ball components, e.g., hardness, may be controlled by adjusting the ratio of prepolymer to curing agent, which is a function of the NCO content of the prepolymer and molecular weight of the curing agent. For example, the ratio of a polyurea prepolymer with 6 percent unreacted NCO groups cured with 1,4-butanediol is 15.6:1, whereas the ratio of the same prepolymer cured with 4,4'-bis-(sec-butylamino)-dicyclohexylmethane (Clearlink® 1000) is 4.36:1. The ratio of prepolymer to curing agent for the purposes of this invention is preferably from about 0.5:1 to about 16:1. In one embodiment, the equivalent ratio of prepolymer to curing agent may be about 0.7:1.0 to about 1.3:1.0, preferably about 0.9:1 to about 1.15:1.0. In another embodiment, the prepolymer to curing agent ratio is about 1.0:1.0 to about 1.1:1.0. In an alternative embodiment, the ratio of prepolymer to curing agent is about 1.1:0.90, preferably about 1.0:0.95.

The curing agent of the invention may include a hydroxy-terminated curing agent, an amine-terminated curing agent, or a combination thereof, the selection of which depends on the desired linkage, i.e., urethane, urea, or both. Both types of curing agents, i.e., hydroxy-terminated and amine curatives, may include one or more saturated, unsaturated, linear, branched, aromatic, and cyclic groups. Additionally, the hydroxy-terminated and amine curatives may include one or more halogen groups. And, as discussed above, the curing agents of the present invention are preferably trifunctional in order to improve the crosslink density of the composition. The trifunctional compounds discussed earlier in the application are also suitable for use as curing agents.

Suitable hydroxy-terminated curing agents include, but are not limited to, castor oil, ethylene glycol; diethylene glycol; polyethylene glycol; propylene glycol; 2-methyl-1,3-propanediol; 2-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; cyclohexyldimethylol; N,N,N'N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; 1,3-bis-(2-hydroxyethoxy)benzene; 1,3-bis-[2-(2-hydroxyethoxy) ethoxy]benzene; 1,3-bis-{2-[2-(2-hydroxyethoxy)ethoxy] ethoxy} benzene; polytetramethylene ether glycol, preferably having a molecular weight ranging from about 250 to about 3900; resorcinol-di-(beat-hydroxyethyl)ether and its derivatives; hydroquinone-di-(beta-hydroxyethyl)ether and its derivatives; 1,3-bis-(2-hydroxyethoxy) benzene; 1,3-bis-[2-(2-hydroxyethoxy)ethoxy]benzene; N,N-bis(β-hydroxypropyl) aniline; 2-propanol-1,1'-phenylaminobis; 2,4,6-tris (N-methyl-N-hydroxymethyl-aminomethyl)phenol; 1,2,4-butanetriol; 1,2,6-hexanetriol; trimethylethane;

trimethylolpropane; triethanolamine; triisopropanolamine; pentaerythritol; 1,2,3,4,5,6-hexanehexol; sorbitol; and mixtures thereof. The hydroxy-terminated curing agent may have a molecular weight of at least about 50. In one embodiment, the molecular weight of the hydroxy-terminated curing agent is about 2000 or less.

The saturated hydroxy-terminated curing agents, included in the list above, are preferred when making a light stable composition. Those saturated hydroxy-terminated curing agents include, but are not limited to, ethylene glycol; diethylene glycol; polyethylene glycol; propylene glycol; 2-methyl-1,3-propanediol; 2-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; cyclohexyldimethylol; N,N,N',N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy] cyclohexane; 1,3-bis-{2-[2-(2-hydroxyethoxy)ethoxy] ethoxy}cyclohexane; 1,2,4-butanetriol; 1,2,6-hexanetriol; trimethyolethane; trimethylolpropane; triethanolamine; triisopropanolamine; pentaerythritol; 1,2,3,4,5,6-hexanehexyl; sorbitol; polytetramethylene ether glycol having molecular weight ranging from about 250 to about 3900; and mixtures thereof.

Furthermore, even though polyols used in polyurethane prepolymers are traditionally long chain and curing agents are traditionally short chain, any of the polyols discussed above with respect to the prepolymers of the invention are suitable for use as hydroxy-terminated curing agents.

Suitable amine-terminated curing agents for use with the present invention include, but are not limited to, primary diamine curing agents, secondary diamine curing agents, and mixtures thereof. In addition, any of the amine-terminated compounds discussed above with respect to the prepolymers of the invention are suitable for use as a curing agent. Examples of amine-terminated curing agents contemplated for use include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine); diethylene glycol bis-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine (commercially available from Huntsman Corporation under the tradename Jefflink® 754); polyoxypropylene diamine; propylene oxide-based triamine; 3,3'-dimethyl-4,4'-diaminocyclohexylmethane; 1,2-, 1,3-, and 1,4-bis-(sec-butylamino) xylene; 1,2-, 1,3-, and 1,4-bis-(sec-butylamino methyl)cyclohexane; and mixtures thereof. In one embodiment, the amine-terminated curing agent is 4,4'-bis-(sec-butylamino)-dicyclohexylmethane. In one embodiment, the amine-terminated curing agent may have a molecular weight of about 64 or greater. In another embodiment, the molecular weight of the amine-curing agent is about 2000 or less. In addition, any of the amine-terminated moieties listed above may be used as curing agents to react with the polyurea prepolymers.

Of the list above, the saturated amine-terminated curing agents suitable for use with the present invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 1,2-, 1,3-, and 1,4-bis-(sec-butylamino) xylene; 1,2-, 1,3-, and 1,4-bis-(sec-butylamino methyl)cyclohexane; N,N'-diethylmaleate-2-methyl-pentamethylene diamine (Desmophen® NH 1220); N,N'-di(ethylmaleate-amino)-dicyclohexylmethane (Desmophen® NH 1420); N,N'-di(ethylmaleate-amino)-dimethyl-dicyclohexylmethane (Desmophen® NH 1520); 3-{[(5-amino-1,3,3-trimethylcyclohexyl)methyl]amino}-propane nitrile; and mixtures thereof.

In one aspect of the invention, the curing agent may be part of a curative blend that includes the at least one curing agent and at least one primary amine, triol, triamine, or combinations thereof. For example, if included, the primary diamines are preferably higher molecular weight primary diamines that may be employed to increase the crosslink density of the compositions of the invention. Suitable primary diamines for use with the present invention include, but are not limited to, 4,4'-diaminodicyclohexylmethane, 3,3'-dimethyl-4,4'-diaminodicyclohexylmethane, polyoxyethylene diamines, polyoxypropylene diamines, (ethylene oxide-capped)-polyoxypropylene diamines, polytetramethylene ether diamines, and mixtures thereof. When present in the curative blend, the primary amine, triol, and/or triamine are preferably included in an amount of about 1 percent to about 50 percent by weight of the curative blend. In one embodiment, the curative blend includes about 5 percent to about 40 percent of at least one primary amine, triol, and/or triamine.

In another aspect of the invention, the curing agent may be part of a modified curative blend as disclosed in co-pending U.S. patent application Ser. No. 10/339,603, filed Jan. 10, 2003, entitled "Polyurethane Compositions for Golf Balls," which is incorporated by reference herein in its entirety. For example, the curing agent of the invention may be modified with a freezing point depressing agent to create a curative blend with a slower onset of solidification and with storage stable pigment dispersion. A number of amine-terminated curing agents have relatively high freezing points, e.g., hexamethylene diamine (105.8° F.), diethanolamine (82.4° F.), triethanol amine (69.8° F.), diisopropanolamine (73.4° F.), and triisopropanolamine (111.2° F.). Such amine-terminated curing agents may be modified with an amine-terminated freezing point depressing agent or a mixture of amine-terminated freezing point depressing agents. Suitable amine-terminated freezing point depressing agents include, but are not limited to, ethylene diamine, 1,3-diaminopropane, dimethylamino propylamine, tetraethylene pentamine, 1,2-propylenediamine, diethylaminopropylamine, 2,2,4-trimethyl-1,6-hexanediamine, 2,4,4-trimethyl-1,6-hexanediamine, and mixtures thereof. In one embodiment, the modified curative blend includes at least one trifunctional material.

The freezing point depressing agent is preferably added in an amount sufficient to reduce the freezing point of the curing agent by a suitable amount to prevent loss of pigment dispersion, but not affect the physical properties of the golf ball. In one embodiment, the freezing point depressing agent is added to the curing agent in an amount of about 5 percent or greater by weight of the curative blend, i.e., curing agent(s), freezing point depressing agent. In another embodiment, the freezing point depressing agent is present in an amount of about 8 percent greater by weight of the curative blend. In still another embodiment, the freezing point depressing agent is present in an amount of about 10 percent or greater. In yet another embodiment, the curative blend includes the freezing point depressing agent in an amount of about 12 percent or greater by weight of the curative blend. The curative blend may also include a freezing point depressing agent in an amount of about 14 percent or greater by weight of the curative blend.

In addition, after freezing and subsequent thawing, the modified curative blend preferably has a pigment dispersion of greater than 0 on the Hegman scale, preferably about 1 or greater, and more preferably about 2 or greater. In one embodiment, the modified curative blend after a freeze/thaw cycle has a pigment dispersion of about 3 or greater on the Hegman scale. In another embodiment, the modified curative blend after a freeze and thaw is about 4 or greater on the Hegman scale, preferably about 5 or greater. In still another embodiment, the modified curative blend after a freeze and thaw is about 6 or greater on the Hegman scale. In yet another embodiment, the modified curative blend after freezing and thawing is about 7 or greater on the Hegman scale.

Additives

Additional materials may be added to the compositions of the invention including, but not limited to, coloring agents or dyes, optical brighteners, crosslinking agents, whitening agents such as $TiO_2$ and ZnO, UV absorbers, hindered amine light stabilizers, defoaming agents, processing aids, softening agents, plasticizers, surfactants, impact modifiers, fillers, reinforcing materials, catalysts, compatibilizers, fragrance components, and other conventional additives. Those of ordinary skill in the art are aware of the purpose of these additives and the amounts that should be employed to fulfill those purposes.

For example, fillers may be added to the compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind (having a Mooney viscosity of about 55 or greater), and mixtures thereof.

In addition, the compositions of the invention may contain at least one light stabilizing component. As used herein, light stabilizer may be understood to include hindered amine light stabilizers, ultraviolet (UV) absorbers, and antioxidants. While the compositions of the invention preferably include only saturated components, which are typically resistant to discoloration, they are not immune to deterioration in their mechanical properties upon weathering. Addition of UV absorbers and light stabilizers to any of the above compositions may help to maintain the tensile strength, elongation, and color stability. The use of light stabilizing components also may assist in preventing cover surface fractures due to photodegradation. Suitable light stabilizers include, but are not limited to, TINUVIN® 292, TINUVIN® 328, TINUVIN® 213, TINUVIN® 765, TINUVIN® 770 and TINUVIN® 622. TINUVIN® products are available from Ciba Specialty Chemicals of Tarrytown, N.Y. In one embodiment, the light stabilizer is UV absorber TINUVIN® 328, which is useful with aromatic compounds. In another embodiment, hindered amine light stabilizer TINUVIN® 765 is used with aromatic or aliphatic compounds. In addition, TINUVIN® 292 may also be used with the aromatic or aliphatic compositions of the invention.

Moreover, as discussed above, dyes, as well as optical brighteners and fluorescent pigments may also be included in the golf ball covers produced with polymers formed according to the present invention. Such additional ingredients may be added in any amounts that will achieve their desired purpose. For example, a white dispersion may used in the compositions of the invention, preferably in an amount of about 0.5 percent to about 10 percent by weight of the composition. In one embodiment, the composition of the invention includes about 2 percent to about 8 percent of white dispersion by weight of the composition. In another embodiment, the white dispersion is present in the composition in an amount of about 3 percent to about 6 percent by weight of the composition. In still another embodiment, the white dispersion is present in the composition in an amount of about 3.5 percent to about 5 percent by weight of the composition.

A catalyst may also be employed in the compositions of the invention to increase or decrease the reaction between the prepolymer and the curing agent for the polyurethane and polyurea compositions of the invention. For example, while the use of a catalyst is usually employed in polyurethane compositions to increase the rate of reaction, a catalyst may be used with the polyurea system in order to slow down the reaction rate.

As such, with regard to a polyurethane composition of the invention, a catalyst is preferably added in an amount sufficient to catalyze the reaction of the components in the reactive mixture. In one embodiment, the catalyst is present in an amount from about 0.001 percent to about 5 percent by weight of the composition. For example, when using a tin catalyst, such as bis-butyltin dilaurate, the catalyst is preferably present in an amount from about 0.005 percent to about 1 percent. In another embodiment, the catalyst is present in an amount of about 0.05 weight percent or greater. In another embodiment, the catalyst is present in an amount of about 0.5 weight percent or greater.

Suitable catalysts for use with the polyurethane and polyurea compositions of the invention include, but are not limited to bismuth catalyst; zinc octoate; stannous octoate; tin catalysts such as bis-butyltin dilaurate (DABCO® T-12 manufactured by Air Products and Chemicals, Inc.), bis-butyltin diacetate (DABCO® T-1); stannous octoate (DABCO® T-9); tin (II) chloride, tin (IV) chloride, bis-butyltin dimethoxide (FASCAT®-4211), dimethyl-bis[1-oxonedecyl)oxy]stannane (FORMEZ® UL-28), di-n-octyltin bis-isooctyl mercaptoacetate (FORMEZ® UL-29); amine catalysts such as triethylenediamine (DABCO® 33-LV), triethylamine, and tributylamine; organic acids such as oleic acid and acetic acid; delayed catalysts such as POLYCAT® SA-1, POLYCAT® SA-2, POLYCAT®, and the like; and mixtures thereof. In one embodiment, the catalyst is bis-butyltin dilaurate.

Use of low levels of tin catalysts, typically from about 0 to about 0.04 weight percent of the total composition, requires high temperatures to achieve a suitable reaction rate, which may result in degradation of the prepolymer. Increasing the amount of catalysts to unconventional high levels enables the reduction in process temperatures while retaining comparable cure stages. Use of the higher catalyst level also allows the mixing speeds to be reduced. Thus, in one embodiment, the tin catalyst is present in an amount from about 0.01 percent to about 0.55 percent by weight of the composition. In another embodiment, about 0.05 percent to about 0.4 percent of tin catalyst is present in the composition. In yet another embodiment, the tin catalyst is present in an amount from about 0.1 percent to about 0.25 percent.

Furthermore, some materials used in the compositions of the invention are odorous in nature or produce odors during reaction with other materials or with oxygen. A fragrance or masking component may be added to the compositions of the invention to eliminate odors.

The fragrance component is preferably added in an amount of about 0.01 percent to about 1.5 percent by weight of the composition. In one embodiment, the fragrance component is added to the composition in an amount of about 0.03 percent to about 1.2 percent by weight of the composition. In another embodiment, the fragrance component is added in an amount of about 0.5 percent to about 1 percent by weight of the composition. Suitable fragrance components include, but are not limited to, Long Lasting Fragrance Mask #59672, Long Lasting Fragrance Mask #46064, Long Lasting Fragrance Mask #55248, Non-Descript Fragrance Mask #97779, Fresh and Clean Fragrance Mask #88177, and Garden Fresh Fragrance Mask #87473, all of which are manufactured by Flavor and Fragrance Specialties of Mahwah, N.J. Other non-limiting examples of fragrance components that may be added to the compositions of the invention include benzaldehyde, benzyl benzoate, benzyl propionate, benzyl salicylate, benzyl alcohol, cinnamic aldehydes, natural and essential oils derived from botanical sources, and mixtures thereof.

Methods of Forming

The compositions of the invention may be formed using a variety of methods. There are two basic techniques used to process the polyurethane and polyurea-based elastomers of the present invention: the one-shot technique and the prepolymer technique. The one-shot technique reacts the isocyanate, the polyol and/or amine-terminated compound, and the curing agent in one step, whereas the prepolymer technique requires a first reaction between the polyol and/or amine-terminated compound and an isocyanate to produce a polyurethane or polyurea prepolymer, respectively, and a subsequent reaction between the prepolymer and a curing agent. Either method may be employed to produce the compositions of the invention, however, the prepolymer technique is preferred because it provides better control of chemical reaction and, consequently, results in more uniform properties for the elastomers.

Acid Functionalization of Compositions

The present invention also contemplates the acid functionalization of the compositions of the invention as disclosed in U.S. Patent Publication No. 2003/0153716, which is incorporated by reference herein in its entirety. Without being bound to any particular theory, it is believed that compositions including acid functional moieties or groups have improved adhesion to other components or layers. The acid functional group is preferably based on a sulfonic group ($HSO_3$), carboxylic group ($HCO_2$), phosphoric acid group ($H_2PO_3$), or a combination thereof. More than one type of acid functional group may be incorporated into the polyurea or polyurethane.

In one embodiment, the acid functional polyurea or polyurethane is prepared from a prepolymer having acid functional moieties. The acid group(s) may be incorporated onto the isocyanate, polyol component, or curing agent when making a polyurethane composition. When making a polyurea composition of the invention, the acid group(s) may be incorporated onto the isocyanate, amine-terminated component, or curing agent.

The acid group(s) may also be incorporated during a post-polymerization reaction, wherein the acid functional group(s) is introduced or attached to the polyurea or polyurethane. Moreover, the acid functional polyurea or polyurethanes made by way of copolymerization as described above may be further incorporated with additional acid functional groups through such post-polymerization reactions. Suitable agents to incorporate acid functional groups onto the polyurea or polyurethane and methods for making are described in U.S. Pat. No. 6,207,784, the entire disclosure of which is incorporated by reference herein. One of ordinary skill in the art would be aware of other ways to prepare the acid functional polyurea or polyurethane. For example, a combination of the embodiments described above may be used as described in U.S. Pat. No. 5,661,207, the disclosure of which is incorporated by reference in its entirety herein.

Suitable acid functional polyols for use in the polyurethane compositions of the invention, along with reagents and methods used to derive such acid functional polyols, are disclosed in detail in U.S. Pat. Nos. 5,661,207 and 6,103,822, the disclosures of which are incorporated herein by reference in their entirety. In one embodiment, acid functional polyols for use in a polyurethane prepolymer includes carboxylated, sulfonated, or phosphonated derivatives of polyester polyols. Suitable acid functional polyols may have an acid number (calculated by dividing acid equivalent weight to 56,100) of at least about 10, preferably from about 20 to about 420, more preferably from about 25 to about 150, and most preferably from about 30 to about 75. In addition, the hydroxyl number (calculated by dividing hydroxyl equivalent number to 56,100) of the polyols may be at least about 10, preferably from about 20 to about 840, and more preferably from about 20 to about 175, and most preferably from about 50 to about 150. The polyols may also have a hydroxyl functionality (average number of hydroxyl groups per polyol molecule) of at least about 1.8, preferably from about 2 to about 4.

Suitable acid functional isocyanates include conventional isocyanates having an acid functional group that may be formed by reacting an isocyanate and an acid functional group containing compound as described in U.S. Pat. Nos. 4,956,438 and 5,071,578, the disclosures of which are incorporated herein by reference in their entirety.

The acid functional polyurethanes or polyureas may be partially or fully neutralized with an organic or an inorganic metal base and/or a tertiary amine to produce anionic polyurethanes/polyurea ionomers. The base may be added during preparation of the prepolymer or as a separate neutralization step on the already polymerized acid functional polyurethane and polyurea. If these stages occur simultaneously, the base is preferably present throughout all stages.

Suitable metal bases used for partial or total neutralization may include compounds such as metal oxides, metal hydroxides, metal carbonates, metal bicarbonates and metal acetates. The metal ions may include, but are not be limited to, Group IA, IB, IIA, IIB, IIIA, IIIB, IVA, IVB, VA, VB, VIIA, VIIB, VIIB and VIIIB metal ions. Preferred metallic ions of such bases include lithium, sodium, potassium, magnesium, zinc, calcium, manganese, aluminum, tungsten, zirconium, titanium and hafnium. The amines are preferably hindered organic tertiary amines such as tributylamine, triethylamine, triethylene diamine, dimethyl cetylamine and similar compounds. Primary or secondary amines may be used, preferably only if the neutralization step takes place after the polymer is formed, because the amine hydrogen will readily react with the isocyanate groups thereby interfering with the polyurea or polyurethane polymerization. One of ordinary skill in the art is aware of additional appropriate chemicals for neutralization.

Composition Blends

The compositions of the invention may be blended with other conventional materials. For example, in one embodiment, the composition contains about 10 percent to about 90 percent of the composition of the invention, preferably from about 10 percent to about 75 percent, and contains about 90 percent to 10 percent, more preferably from about 90 percent to about 25 percent other polymers and/or other materials as described below. Unless otherwise stated herein, all percentages are given in percent by weight of the total composition of the golf ball layer in question.

Other polymeric materials suitable for blending with the compositions of the invention include castable thermoplastics, cationic and anionic urethane ionomers (as disclosed in U.S. Pat. No. 5,692,974) and urethane epoxies (as disclosed in U.S. Pat. No. 5,908,358), polyurethane ionomers, polyurea ionomers (as disclosed in U.S. Pat. No. 5,484,870), epoxy resins, polyethylenes, polyamides and polyesters, polycarbonates, polyacrylin, siloxanes and epoxy resins or their blends, and mixtures thereof. One of ordinary skill in the art would be well aware of methods to blend the polymeric materials with the composition of the invention. The disclosures of the above patents are incorporated herein by reference in their entirety.

Crosslink Density

The functionality of the composition components has a significant effect on the potential crosslink density. As used herein, crosslink density refers to moles of crosslinked basic units per weight unit of the crosslinked polymer. For example, a monomer with a functionality of two means that monomer can only link to two other reactive sites, whereas a monomer with a functionality of three can link to three other reactive sites. In a system where one out of every 20 molecules is a bifunctional isocyanate, and 10 of every 20 molecules is a bifunctional amine or alcohol, the crosslink density is 0.05. Therefore, the use of a trifunctional isocyanate in place of a bifunctional isocyanate increases the amount of reactive sites and, therefore, increases the crosslink density.

Because the compositions of the invention include at least one trifunctional component, the compositions of the invention have an improved crosslink density (or crosslink concentration) over that of more conventional cover compositions, which, in turn, leads to greater dimensional stability, increased mechanical strength, and improved heat resistance.

In one embodiment, the crosslink density of the compositions of the invention is about 0.05 or greater. In another embodiment, the crosslink density of the compositions of the invention is about 0.1 or greater. In still another embodiment, the crosslink density of the compositions of the invention is about 0.2 or greater. In yet another embodiment, the crosslink density of the compositions of the invention is about 0.5 or greater. For example, the crosslink density of the compositions of the invention may be about 0.8 or greater. In another embodiment, the crosslink density of the compositions of the invention is about 1 or greater. In still another embodiment, the crosslink density is about 2 or greater.

Those of ordinary skill in the art are aware of the number of ways that crosslink density can be determined in a polymer network. For example, one method involves the use of Pulsed Nuclear Magnetic Resonance (NMR) spectroscopy. In addition, solvent swelling may be used to determine crosslink density because the extent of swelling is inversely proportional to the crosslink density of a network polymer.

As known to those of skill in the art, however, as the crosslink density increases in a polymer, there is generally a decrease in the flexibility of the polymer chains, i.e., the polymer chains are less able to move freely and rotate in a network. Thus, it is important to achieve a crosslink density that provides dimensional stability, but does not have a negative impact on the flexibility of the material. Without being bound by any particular theory, it is believed that one way of achieving this balance is to use high average molecular weight segments between crosslinks ($M_c$) so as to allow for a greater number of polymer chains to become load bearing under strain, which, in turn, results in higher tensile strength.

In one embodiment, the segments between crosslinks have an $M_c$ of about 3000 or greater, preferably about 4000 or greater. In another embodiment, the $M_c$ is about 5000 or greater. In still another embodiment, the $M_c$ is about 7000 or greater. In yet another embodiment, the $M_c$ is about 11,000 or greater. For example, the $M_c$ may be about 15,000 or greater. In one embodiment, the $M_c$ is about 20,000 or greater.

Glass Transition Temperature

As discussed above, the effective chain length between crosslinks ($M_c$) effects the mechanical properties, e.g., elasticity and elongation, of the compositions of the invention. In addition, the mechanical properties of a composition also strongly depend on its glass transition temperature ($T_g$). For example, compositions with lower $T_g$s are believed to be more resilient. As such, the compositions of the invention preferably have a lower glass transition temperature than that of a comparable composition does not include a trifunctional component. In other words, the compositions of the invention preferably have glass transition temperatures low enough that play in non-optimal temperatures does not result in loss of resiliency.

As discussed in the preceding section, a lower crosslink density generally leads to a more flexible polymer composition, i.e., the effective chain length is high. In fact, the highest flexibility is obtained with non-crosslinked polymers. However, the flexibility of a polymer composition can be enhanced by increasing the linear molecular weight between crosslinks. As such, it is now believed that a higher molecular weight between crosslinks in the compositions of the invention lead to lower glass transition temperatures because of the increased flexibility in the individual polymer chains.

It is important to note that $T_g$ is distinct from the onset softening temperature or melting point of a polymer or composition. In fact, onset softening and melting are transitions that occurs in crystalline polymers when the polymer chains fall out of their crystal structures and become a disordered liquid. On the other hand, the glass transition temperature is a transition that happens to amorphous polymers, i.e., polymers whose chains are not arranged in ordered crystals, even though they are in the solid state. However, even crystalline polymers will have an amorphous portion, e.g., about 40 percent to about 70 percent of the polymer, which is why the same polymer can have both a glass transition temperature and a melting temperature or onset softening temperature. One of ordinary skill in the art should be aware of methods for determining the $T_g$ of a composition. For example, differential scanning calorimetry will provide the glass transition temperature, the crystallization temperature, and the melting temperature.

The $T_g$ of a composition of the invention is preferably about 68° F. or less. In one embodiment, the $T_g$ of a composition of the invention is about 60° F. or less, preferably about 50° F. or less. For example, the $T_g$ of a composition of the invention may be about 40° F. or less so that golfers in cold climates can continue to play through the winter season. In another embodiment, the $T_g$ of a composition of the invention is about 32° F. or less. In still another embodiment, the $T_g$ of a composition of the invention is about 20° F. or less. In yet another embodiment, the $T_g$ of a composition of the invention is about 10° F. or less.

Onset Softening Temperature

The compositions of the invention preferably have a higher onset softening temperature than comparable compositions that do not include trifunctional components. As used herein, "onset softening temperature" refers to the temperature at which a material begins to soften upon application of heat. Thus, in order to have improved heat resistance, the compositions of the invention preferably have a higher onset softening temperature than known compositions.

One indicator of the onset softening temperature is a timed ultraviolet exposure test. For example, a control ball component made from a known composition may be tested against a ball component made according to the present invention by subjecting the balls to exposure to ultraviolet light for a predetermined number of days, e.g., 5 days, 8 days, etc. The ball component may be observed for wrinkling, melting, or softening over this time period. The compositions of the invention preferably do not suffer from wrinkling, melting, and/or softening under ultraviolet light exposure for at least about 5 days. In one embodiment, no wrinkling, melting, or softening occurs for at least about 8 days. In another embodiment, the compositions of the invention do not wrinkle, melt, or soften upon exposure to ultraviolet for at least about 10 days or more.

In one embodiment, the compositions of the invention have an onset softening temperature of about 90° F. or greater, preferably about 100° F. or greater. In another embodiment, the onset softening temperature of the compositions of the invention is about 110° F. or greater. In still another embodiment, the compositions of the invention have an onset softening temperature of about 120° F. or greater. In yet another embodiment, the onset softening temperature is about 150° F. or greater.

Changes in COR

Golf ball components formed from compositions of the invention preferably exhibit appreciable changes in COR as the temperature decreases, generally through the range of about 70° F. to about 20° F. This differs from conventional components in that the COR of conventional components is usually static when the temperature decreases. In one embodiment, a golf ball component formed according to the invention exhibits an increase in COR of about 7 percent or greater when the temperature decreases by about 15° F. or more. In another embodiment, the COR increases by about 15 percent or greater when the temperature decreases by about 30 degrees or more. In yet another embodiment, the COR increases by about 20 percent or greater when the temperature decreases by about 40 degrees or greater.

The tangent delta (tan δ) is inversely related to the changes in the COR for components formed from compositions of the invention. The tan δ is defined as the ratio of the loss modulus to the storage modulus. Thus, the higher the tan δ, the less resilient (or deader) the material. As such, when the compositions of the invention have an increase in COR as the temperature decreases through the range of about 70° F. to about 20° F., the tan δ decreases. In one embodiment, the tan δ decreases by at least about 0.1 with a decrease in temperature of about 15° F. or more. In another embodiment, the tan δ decreases by at least about 0.2 with a decrease in temperature of about 30° F. or more. In yet another embodiment, the tan δ decreases by at least about 0.25 when the temperature decreases by about 40° F. or more.

In other words, the tan δ of the compositions of the invention preferably decreases by about 30 percent or more with a decrease in temperature of about 15° F. or more. In one embodiment, the tan δ decreases by about 40 percent or greater when the temperature decreases by about 20° F. or more. In another embodiment, when the temperature decreases by about 30° F. or greater, the tan δ decreases by about 50 percent or more, preferably about 60 percent or greater. In still another embodiment, the tan δ of the compositions of the invention preferably decreases by about 70 percent or more with a decrease in temperature of about 30° F. or more.

In contrast to the golf ball component formed from the compositions of the invention, golf balls having a cover formed of the compositions of the invention, i.e., golf balls typically having at least a core and a cover, have little to no appreciable change in COR when temperature is decreased through the range of about 70° F. to about 5° F. For example, when the temperature is decreased by about 15 degrees or greater, the COR of a multi-component golf ball formed from a composition of the invention preferably drops by about 5 percent or less. In one embodiment, the COR changes by about 3 percent or less with a temperature change of about 15 degrees or greater. In another embodiment, the COR changes by about 2 percent or less with a temperature change of about 15 degrees or greater. This differs from conventional balls with polybutadiene cores in that conventional balls exhibit changes in COR as the temperature decreases.

When the temperature drops more dramatically, such as a change of about 45 degrees or greater, the COR of a component formed from a composition of the invention preferably changes by about 5 percent or less. In one embodiment, the COR changes by about 4 percent or less with a change in temperature of about 45 degrees or greater. More preferably, the COR changes by about 3 percent or less with a change in temperature of about 45 degrees or greater. In another embodiment, the change in COR is about 2 percent or less with a change in temperature of about 45 degrees or greater. In still another embodiment, the COR has no appreciable change when the temperature changes by about 45 degrees or more. As used herein, "no appreciable change" refers to a COR value that changes by less than about 1 percent over a given temperature range.

When the temperature drops even more dramatically, such as a change in temperature of about 60 degrees or greater, the COR of a component formed from a composition of the invention preferably changes by about 10 percent or less. In one embodiment, the COR changes by about 7 percent or less with a change in temperature of about 60 degrees or greater. More preferably, the COR changes by about 5 percent or less with a change in temperature of about 60 degrees or greater. In another embodiment, the change in COR is about 3 percent or less with a change in temperature of about 60 degrees or greater. In still another embodiment, the COR has no appreciable change when the temperature changes by about 60 degrees or more.

Golf Ball Construction

The compositions of the present invention may be used with any type of ball construction. For example, one-piece, two-piece, three-piece, and four-piece golf ball designs are contemplated by the present invention. In addition, golf balls having double cores, intermediate layer(s), and/or double covers are also useful with the present invention. As known to those of ordinary skill in the art, the type of golf ball constructed, i.e., double core, double cover, and the like, depends on the type of performance desired of the ball. As used herein, the term "layer" includes any generally spherical portion of a golf ball, i.e., a golf ball core or center, an intermediate layer, and/or a golf ball cover. As used herein, the term "inner layer" refers to any golf ball layer beneath the outermost structural layer of the golf ball. As used herein, "structural layer" does not include a coating layer, top coat, paint layer, or the like. As used herein, the term "multilayer" means at least two layers.

Figure 2:
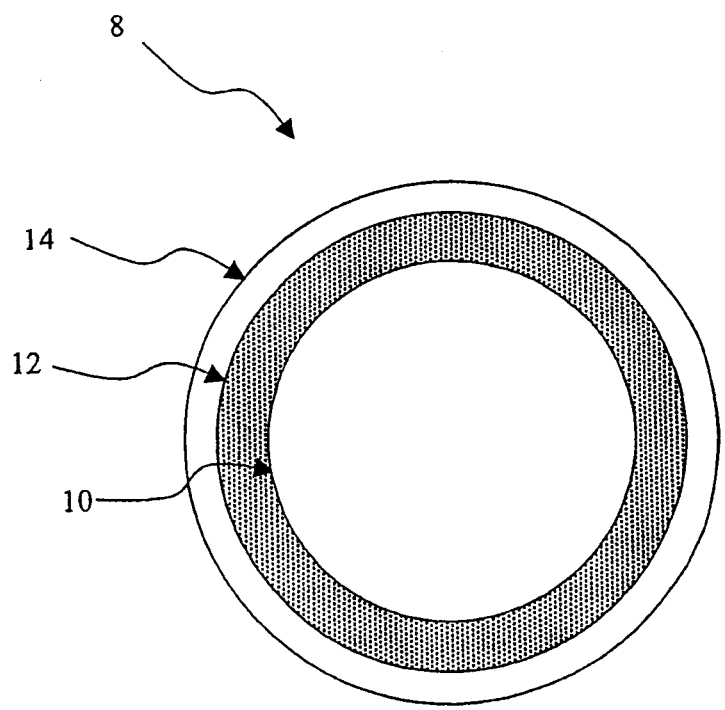
FIG. 2 is a cross-sectional view of a multi-component golf ball, wherein at least a portion of the golf ball is formed from the compositions of the invention.
Figure 3:
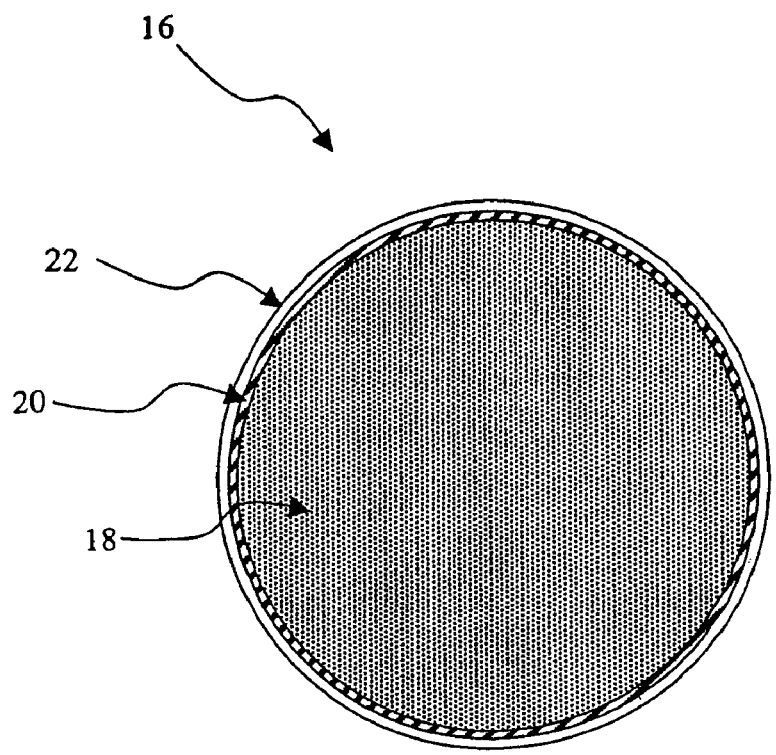
FIG. 3 is a cross-sectional view of a multi-component golf ball including a large core, an intermediate layer, and a thin outer cover layer disposed thereon, wherein at least a portion of the golf ball is formed from the compositions of the invention.
Figure 4:
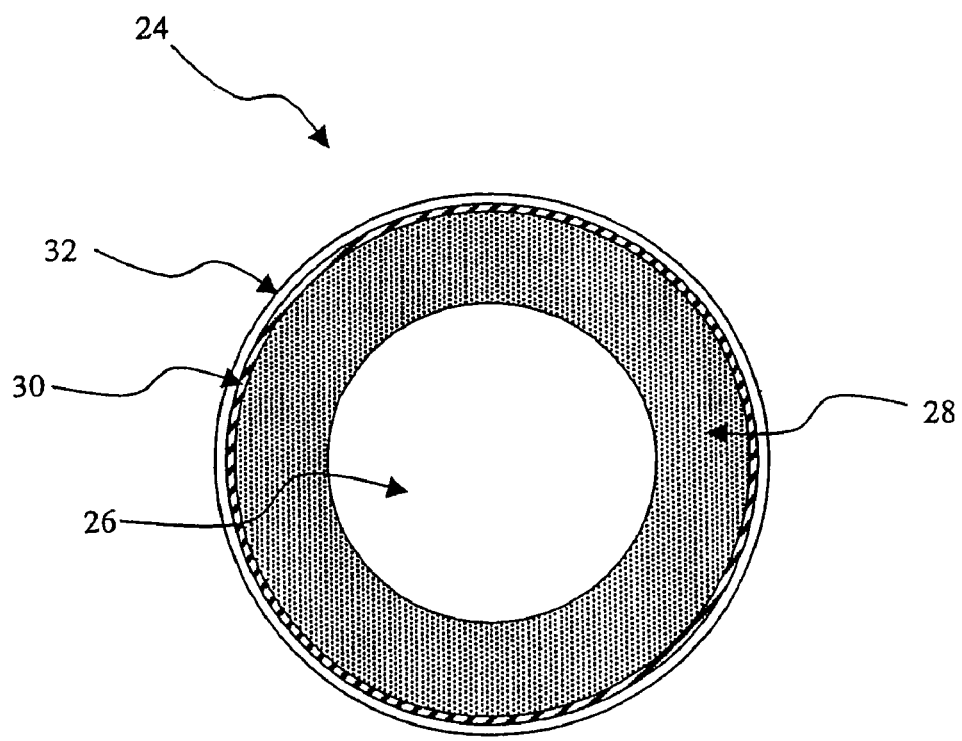
FIG. 4 is a cross-sectional view of a multi-component golf ball including a core, an outer core layer, a thin inner cover layer, and a thin outer cover layer disposed thereon, wherein at least a portion of the golf ball is formed from the compositions of the invention.

In one embodiment, a golf ball 2 according to the invention (as shown in FIG. 1) includes a core 4 and a cover 6, wherein the at least one of core 4 and cover 6 incorporates at least one layer including the composition of the invention. Similarly, FIG. 2 illustrates a golf ball according to the invention incorporating an intermediate layer. Golf ball 8 includes a core 10, a cover 14, and an intermediate layer 12 disposed between the core 10 and cover 14. Any of the core 10, intermediate layer 12, or cover 14 may incorporate at least one layer that includes the compositions of the invention. FIG. 3 illustrates a multilayer golf ball 16 according to the invention including a large core 18, an outer core layer, intermediate layer, or inner cover layer 20, and an outer cover layer 22. Any of the core 18, outer core layer, intermediate layer, or inner cover layer 20, and outer cover layer 22 may include the composition of the invention. FIG. 4 shows a four-piece golf ball 24 according to the invention including a core 26, an outer core layer or intermediate layer 28, an inner cover layer 30, and an outer cover layer 32. Any of the core 26, outer core layer or intermediate layer 28, inner cover layer 30, and outer cover layer 32 may include the composition of the invention.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, US2002/0028885, US2002/0151380. The entire disclosures of these patents and published patent applications are incorporated by reference herein. For example, in Publication No. US2002/015380, a golf ball having three or more cover layers is disclosed, of which any of the layers of the ball may be formed using the compositions of the invention. In addition, the compositions of the invention are contemplated for use in layers of the gradated hardness multilayer golf balls disclosed in U.S. Patent Publication No. 2001/0005699, which is incorporated by reference herein in its entirety.

As discussed, the golf balls of the invention include at least one structural layer that includes compositions of the invention. In addition, as discussed in more detail below, the golf balls of the invention may include core layers, intermediate layers, or cover layers formed from materials known to those of skill in the art. These examples are not exhaustive, as skilled artisans would be aware that a variety of materials might be used to produce a golf ball of the invention with desired performance properties.

Core Layer(s)

The cores of the golf balls formed according to the invention may be solid, semi-solid, hollow, fluid-filled, or powder filled, but are preferably solid and formed with the compositions of the invention. As used herein, the term "core" means the innermost portion of a golf ball, and may include one or more layers. For example, U.S. Pat. Nos. 6,180,040 and 6,180,722 disclose methods of preparing dual core golf balls. The entire disclosures of these patents are incorporated by reference herein. The term "semi-solid" as used herein refers to a paste, a gel, or the like. The cores of the golf balls of the invention may be spherical, cubical, pyramid-shaped, geodesic, or any three-dimensional, symmetrical shape.

While the cores of the invention may be formed with compositions of the invention, conventional materials may also be used to form the cores. Suitable core materials include, but are not limited to, thermoset materials, such as rubber, styrene butadiene, polybutadiene, isoprene, polyisoprene, trans-isoprene, and polyurethane, and thermoplastic materials, such as conventional ionomer resins, polyamides, polyesters, and polyurethane. In one embodiment, at least one layer of the core is formed from a polybutadiene reaction product, such as the reaction products disclosed in U.S. Patent Publication No. 2003/0119989, the entire disclosure of which is incorporated by reference herein.

The core may also include one or more wound layers (surrounding a fluid or solid center) including at least one tensioned elastomeric material wound about the center. In one embodiment, the tensioned elastomeric material includes natural or synthetic elastomers or blends thereof, in which the synthetic elastomer preferably includes LYCRA. The tensioned elastomeric material may also incorporate conventional polyisoprene, a polybutadiene reaction product, a polyurea composition, and/or solvent spun polyethers urea, as disclosed in co-pending U.S. Patent Publication Nos. 2003/0119989, 2003/0096936 and U.S. Pat. No. 6,149,535, which are incorporated in their entirety by reference herein.

In another aspect of the invention, the golf balls of the invention include a thin, highly filled core layer, such as the ones disclosed in U.S. Pat. No. 6,494,795, which is incorporated by reference herein in its entirety. A thin, highly filled core layer allows the weight or mass of the golf ball to be allocated radially relative to the centroid, thereby dictating the moment of inertia of the ball. When the weight is allocated radially toward the centroid, the moment of inertia is decreased, and when the weight is allocated outward away from the centroid, the moment of inertia is increased.

Intermediate Layer(s)

As used herein, "intermediate layer" includes any layer between the innermost layer of the golf ball and the outermost layer of the golf ball. Therefore, intermediate layers may also be referred to as outer core layers, inner cover layers, and the like. When the golf ball of the present invention includes an intermediate layer, this layer may be formed from the compositions of the invention.

The intermediate layer may also be formed of conventional materials known to those of ordinary skill in the art, including various thermoset and thermoplastic materials, as well as blends thereof. For example, the intermediate layer may be formed, at least in part, from one or more homopolymeric or copolymeric materials, such as vinyl resins, low and high acid ionomer resins, polyolefins, polyurethanes, polyureas, polyamides, acrylic resins, olefinic thermoplastic rubbers, block copolymers of styrene and butadiene, isoprene or ethylene-butylene rubber, copoly(ether-amide), polyphenylene oxide resins, thermoplastic polyesters, ethylene, propylene, 1-butene or 1-hexene based homopolymers or copolymers, and the like.

The intermediate layer may also be formed from highly neutralized polymers such as those disclosed U.S. Patent Publication Nos. 2001/0018375 and 2001/0019971, which are incorporated herein in their entirety by express reference thereto; grafted and non-grafted metallocene catalyzed polyolefins and polyamides, polyamide/ionomer blends, and polyamide/nonionomer blends, such as those disclosed in U.S. Patent Publication No. 2003/0078348, which is incorporated by reference herein in its entirety; among other polymers. Examples of other suitable intermediate layer materials include blends of some of the above materials, such as those disclosed in U.S. Pat. No. 5,688,181, the entire disclosure of which is incorporated by reference herein.

The intermediate layer may also be a moisture barrier layer, such as the ones described in U.S. Pat. No. 5,820,488, which is incorporated in its entirety by reference herein.

Cover Layer(s)

The cover provides the interface between the ball and a club. As used herein, the term "cover" means the outermost portion of a golf ball. A cover typically includes at least one layer and may contain indentations such as dimples and/or ridges. Paints and/or laminates are typically disposed about the cover to protect the golf ball during use thereof. The cover may include a plurality of layers, e.g., an inner cover layer disposed about a golf ball center and an outer cover layer formed thereon.

Inner and/or outer cover layers may be formed from the compositions of the invention. Alternatively, both the inner and/or outer cover layers of golf balls of the present invention may be formed of polyurea, polyurethane, or mixtures thereof, as disclosed in co-pending U.S. Patent Publication Nos. 2003/0096936 and 2003/0212240. The entire disclosures of these publications are incorporated by reference herein.

In addition, cover layers may also be formed of one or more homopolymeric or copolymeric materials, such as vinyl resins, polyolefins, conventional polyurethanes and polyureas, such as the ones disclosed in U.S. Pat. Nos. 5,334,673, and 5,484,870, polyamides, acrylic resins and blends of these resins with poly vinyl chloride, elastomers, and the like, thermoplastic urethanes, olefinic thermoplastic rubbers, block copolymers of styrene and butadiene, polyphenylene oxide resins or blends of polyphenylene oxide with high impact polystyrene, thermoplastic polyesters, ethylene, propylene, 1-butene or 1-hexane based homopolymers or copolymers including functional monomers, methyl acrylate, methyl methacrylate homopolymers and copolymers, low acid ionomers, high acid ionomers, highly neutralized ionomers, alloys, and mixtures thereof. The cover may also be at least partially formed from a polybutadiene reaction product as disclosed in U.S. Patent Publication No. 2003/0119989.

As discussed above with respect to the core of the golf balls of the invention, the use of a thin, highly filled layer allows the weight or mass of the golf ball to be allocated radially relative to the centroid, thereby dictating the moment of inertia of the ball. This concept is translatable to the cover layers of a golf ball. Thus, the inner cover layer may be a thin, dense layer so as to form a high moment of inertia ball. In this aspect of the invention, the inner cover layer preferably has a specific gravity of greater than 1.2, more preferably more than 1.5, even more preferably more than 1.8, and most preferably more than 2.0. Suitable materials for the thin, dense layer include any material that meets the specific gravity stated above. For example, this thin, highly filled inner cover layer may be formed of the radiation-curable compositions of the invention, adjusting for the requisite specific gravity. Alternatively, the inner cover layer may be formed from epoxies, styrenated polyesters, polyurethanes or polyureas, liquid PBR's, silicones, silicate gels, agar gels, and the like.

Additional materials may be included in the core, intermediate layer, and/or cover layer compositions outlined above. For example, catalysts, coloring agents, optical brighteners, crosslinking agents, whitening agents such as $TiO_2$ and $ZnO$, UV absorbers, hindered amine light stabilizers, defoaming agents, processing aids, surfactants, and other conventional additives may be added to the cover layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the cover layer compositions. Those of ordinary skill in the art should be aware of the requisite amount for each type of additive to realize the benefits of that particular additive.

Methods for Forming Golf Ball Components

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like depending on the materials used for a specific component. For example, the compositions of the invention are particular useful in casting applications. Thus, golf ball components including the compositions of the invention may be formed by casting.

One skilled in the art, however, would appreciate that the molding method used may be determined at least partially by the properties of the composition. For example, casting, RIM, or LIM may be preferred when the material is thermoset, whereas compression molding or injection molding may be preferred for thermoplastic compositions. Compression molding, however, may also be used for thermoset inner ball materials. For example, when cores are formed from a thermoset material, compression molding is a particularly suitable method of forming the core, whereas when the cores are formed of a thermoplastic material, the cores may be injection molded. In addition, the intermediate layer may also be formed from using any suitable method known to those of ordinary skill in the art. For instance, an intermediate layer may be formed by blow molding and covered with a dimpled cover layer formed by injection molding, compression molding, casting, vacuum forming, powder coating, and the like.

Any inner layer of the golf balls of the invention may be surface treated prior to cover formation to further increase the adhesion between the outer surface of the inner ball and the cover. In addition, the outermost cover of the golf balls of the invention may be surface treated prior to application of any coating layer. Such surface treatment may include mechanically or chemically abrading the outer surface of the subassembly. Additionally, the inner ball may be subjected to corona discharge, plasma treatment, and/or silane dipping prior to forming the cover around it. Other layers of the ball, e.g., the core, also may be surface treated. Examples of these and other surface treatment techniques can be found in U.S. Pat. No. 6,315,915, which is incorporated by reference in its entirety.

The methods discussed herein and other manufacturing methods for forming the golf ball components of the present invention are also disclosed in U.S. Pat. Nos. 6,207,784 and 5,484,870, the disclosures of which are incorporated herein by reference in their entirety.

Dimples

The golf balls of the invention are preferably designed with certain flight characteristics in mind. The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Alternatively, the dimple pattern can be arranged according to phyllotactic patterns, such as described in U.S. Pat. No. 6,338,684, or a a tubular lattice pattern, such as the one disclosed in U.S. Pat. No. 6,290,615, the disclosures of which are incorporated herein in their entirety.

Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. patent application Ser. No. 10/078,417, which is incorporated in its entirety by reference herein. The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

The golf balls of the present invention may also have a plurality of pyramidal projections disposed on the intermediate layer of the ball, as disclosed in U.S. Pat. No. 6,383,092, which is incorporated in its entirety by reference herein. The plurality of pyramidal projections on the golf ball may cover between about 20 percent to about 80 of the surface of the intermediate layer. In an alternative embodiment, the golf ball may have a non-planar parting line allowing for some of the plurality of pyramidal projections to be disposed about the equator.

Several additional non-limiting examples of dimple patterns with varying sizes of dimples are also provided in U.S. Pat. Nos. 6,358,161 and 6,213,898, the entire disclosures of which are incorporated by reference herein.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In one embodiment, the dimple count on the ball is about 422 dimples. In some cases, it may be desirable to have fewer dimples on the ball. Thus, one embodiment of the present invention has a dimple count of about 380 dimples or less, and more preferably is about 350 dimples or less.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. Patent Publication No. 2003/0114255, which is incorporated in its entirety by reference herein, is contemplated for use with the golf balls of the present invention.

Golf Ball Post-Processing

The golf balls of the present invention may be painted, coated, or surface treated for further benefits. For example, a golf ball of the invention may be treated with a base resin paint composition or the cover composition may contain certain additives to achieve a desired color characteristic. In one embodiment, the golf ball cover composition contains a fluorescent whitening agent to provide improved weather resistance and brightness. An example of such a fluorescent whitening agent is disclosed in U.S. Patent Publication No. 2002/0082358, which is incorporated by reference herein in its entirety.

Protective and decorative coating materials, as well as methods of applying such materials to the surface of a golf ball cover are well known in the golf ball art. Generally, such coating materials comprise urethanes, urethane hybrids, epoxies, polyesters and acrylics. If desired, more than one coating layer can be used. The coating layer(s) may be applied by any suitable method known to those of ordinary skill in the art. For example, the coating layer(s) may be applied to the golf ball cover by an in-mold coating process, such as described in U.S. Pat. No. 5,849,168, which is incorporated in its entirety by reference herein. The coating layer may have a thickness of about 0.004 inches or less, more preferably about 0.002 inches or less.

In addition, the golf balls of the invention may be painted or coated with an ultraviolet curable/treatable ink, by using the methods and materials disclosed in U.S. Pat. Nos. 6,500,495, 6,248,804, and 6,099,415, the entire disclosures of which are incorporated by reference herein.

Furthermore, trademarks or other indicia may be stamped, i.e., pad-printed, on the outer surface of the ball cover, and the stamped outer surface is then treated with at least one clear coat to give the ball a glossy finish and protect the indicia stamped on the cover.

The golf balls of the invention may also be subjected to dye sublimation, wherein at least one golf ball component is subjected to at least one sublimating ink that migrates at a depth into the outer surface and forms an indicia. The at least one sublimating ink preferably includes at least one of an azo dye, a nitroarylamine dye, or an anthraquinone dye. U.S. Patent Publication No. 2003/0106442, the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. Pat. No. 6,462,303, which is incorporated in its entirety by reference herein.

Golf Ball Properties

The properties such as hardness, modulus, core diameter, and layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention. It should be understood that the ranges herein are meant to be intermixed with each other, i.e., the low end of one range may be combined with a high end of another range.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used. Preferably, the overall diameter of the core and all intermediate layers is about 80 percent to about 98 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 11.1 inches and the outer core layer has a thickness of about 0.20 inches to about 0.03 inches.

The cover typically has a thickness to provide sufficient strength, good performance characteristics, and durability. The thickness of the outer cover layer may be from about 0.005 inches to about 0.100 inches, preferably about 0.007 inches to about 0.035 inches. In one embodiment, the cover thickness is from about 0.02 inches to about 0.35 inches. In another embodiment, the cover preferably has a thickness of about 0.02 inches to about 0.12 inches, preferably about 0.1 inches or less, more preferably about 0.07 inches or less. In yet another embodiment, the outer cover has a thickness from about 0.02 inches to about 0.07 inches. In still another embodiment, the cover thickness is about 0.05 inches or less, preferably from about 0.02 inches to about 0.05 inches. For example, the outer cover layer may be between about 0.02 inches and about 0.045 inches, preferably about 0.025 inches to about 0.04 inches thick. In one embodiment, the outer cover layer is about 0.03 inches thick.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less. In another embodiment, the ratio is about 0.5 or less, preferably about 0.45 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

In another embodiment, the cover layer is harder than the intermediate layer. In this design, the ratio of Shore D hardness of the cover layer to the intermediate layer is about 1.33 or less, preferably from about 1.14 or less.

In addition, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. patent application Ser. No. 10/167,744, filed Jun. 13, 2002, entitled "Golf Ball with Multiple Cover Layers," the entire disclosure of which is incorporated by reference herein.

Compression

Compression values are dependent on the diameter of the component being measured. Atti compression is typically used to measure the compression of a golf ball. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J.

The Atti compression of the core, or portion of the core, of golf balls prepared according to the invention is preferably less than about 80, more preferably less than about 75. In another embodiment, the core compression is from about 40 to about 80, preferably from about 50 to about 70. In yet another embodiment, the core compression is preferably below about 50, and more preferably below about 25. In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about to about 120. In another embodiment, the Atti compression of the golf balls of the invention is at least about 40, preferably from about 50 to 120, and more preferably from about 60 to 100. In yet another embodiment, the compression of the golf balls of the invention is about 75 or greater and about 95 or less. For example, a preferred golf ball of the invention may have a compression from about 80 to about 95.

Initial Velocity and COR

There is currently no USGA limit on the COR of a golf ball, but the initial velocity of the golf ball cannot exceed 250±5 feet/second (ft/s). Thus, in one embodiment, the initial velocity is about 245 ft/s or greater and about 255 ft/s or greater. In another embodiment, the initial velocity is about 250 ft/s or greater. In one embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range. For example, a golf ball of the invention may be designed to have an initial velocity of about 220 ft/s or greater, preferably about 225 ft/s or greater.

As a result, of the initial velocity limitation set forth by the USGA, the goal is to maximize COR without violating the 255 ft/s limit. The COR of a ball is measured by taking the ratio of the outbound or rebound velocity to the incoming or inbound velocity. In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Spin Rate

As known to those of ordinary skill in the art, the spin rate of a golf ball will vary depending on the golf ball construction. In a multilayer ball, e.g., a core, an intermediate layer, and a cover, wherein the cover is formed from the compositions of the invention, the spin rate of the ball off a driver ("driver spin rate") may be 1500 rpm or greater. In one embodiment, the driver spin rate is about 2000 rpm to about 3500 rpm. In another embodiment, the driver spin rate is about 2200 rpm to about 3400 rpm. In still another embodiment, the driver spin rate may be less than about 1500 rpm.

Two-piece balls made according to the invention may also have driver spin rates of 1500 rpm and greater. In one embodiment, the driver spin rate is about 2000 rpm to about 3300 rpm. Wound balls made according to the invention preferably have similar spin rates.

Methods of determining the spin rate should be well understood by those of ordinary skill in the art. Examples of methods for determining the spin rate are disclosed in U.S. Pat. Nos. 6,500,073, 6,488,591, 6,286,364, and 6,241,622, which are incorporated by reference herein in their entirety.

Flexural Modulus

Accordingly, it is preferable that the golf balls of the present invention have an intermediate layer with a flexural modulus of about 500 psi to about 500,000 psi according to ASTM D-6272-98. More preferably, the flexural modulus of the intermediate layer is about 1,000 psi to about 250,000 psi. Most preferably, the flexural modulus of the intermediate layer is about 2,000 psi to about 200,000 psi.

The flexural modulus of the cover layer is preferably about 2,000 psi or greater, and more preferably about 5,000 psi or greater. In one embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another embodiment, the flexural modulus of the cover layer is about 100,000 psi or less, preferably about 80,000 or less, and more preferably about 70,000 psi or less. For example, the flexural modulus of the cover layer may be from about 10,000 psi to about 70,000 psi, from about 12,000 psi to about 60,000 psi, or from about 14,000 psi to about 50,000 psi.

In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Specific Gravity

The specific gravity of a cover or intermediate layer is preferably at least about 0.7. In one embodiment, the specific gravity of the intermediate layer or cover is about 0.8 or greater, preferably about 0.9 or greater. For example, in one embodiment, the golf ball has an intermediate layer with a specific gravity of about 0.9 or greater and a cover having a specific gravity of about 0.95 or greater. In another embodiment, the intermediate layer or cover has a specific gravity of about 1.00 or greater. In yet another embodiment, the specific gravity of the intermediate layer or cover is about 1.05 or greater, preferably about 1.10 or greater.

The core may have a specific gravity of about 1.00 or greater, preferably 1.05 or greater. For example, a golf ball of the invention may have a core with a specific gravity of about 1.10 or greater and a cover with a specific gravity of about 0.95 or greater.

EXAMPLES

The following non-limiting examples are merely illustrative of the preferred embodiments of the present invention, and are not to be construed as limiting the invention, the scope of which is defined by the appended claims. Parts are by weight unless otherwise indicated.

Example 1

Resiliency of Unitary Ball Formed with Compositions of the Invention

Unitary golf ball components were formed according to the following formulations:

| PRESENT INVENTION | | CONTROL | |
|---|---|---|---|
| Isocyanate[1] | 1 eq. | Prepolymer[5] | 1 eq. |
| Curative Blend Polycaprolactone triol[2] | 0.80 eq. | Curative Blend Secondary diamine[6] | 0.95 eq. |

-continued

| | PRESENT INVENTION | | CONTROL | |
|---|---|---|---|---|
| Polyester polyol[3] | 0.15 eq. | | | |
| White Dispersion[4] | 3.5% | | White Dispersion[4] | 3.5% |

[1]Vestanat T 6040 Isocyanate (a blend of isophorone diisocyanate and isocyanurate trimer of isophorone diisocyanate), manufactured by Degussa Corporation.
[2]Tone 0305, manufactured by Dow Chemical Company.
[3]Oxyester T 1136, manufactured by Degussa Corporation.
[4]HCC-19584 White Dispersion, manufactured by The PolyOne Corporation.
[5]S28850 Prepolymer, manufactured by PPG Industries.
[6]Clearlink 1000 (4,4'-bis-(sec-butylamino)-dicyclohexylmethane), manufactured by Dorf Ketal Chemicals India PVT, Ltd.

Figure 5:
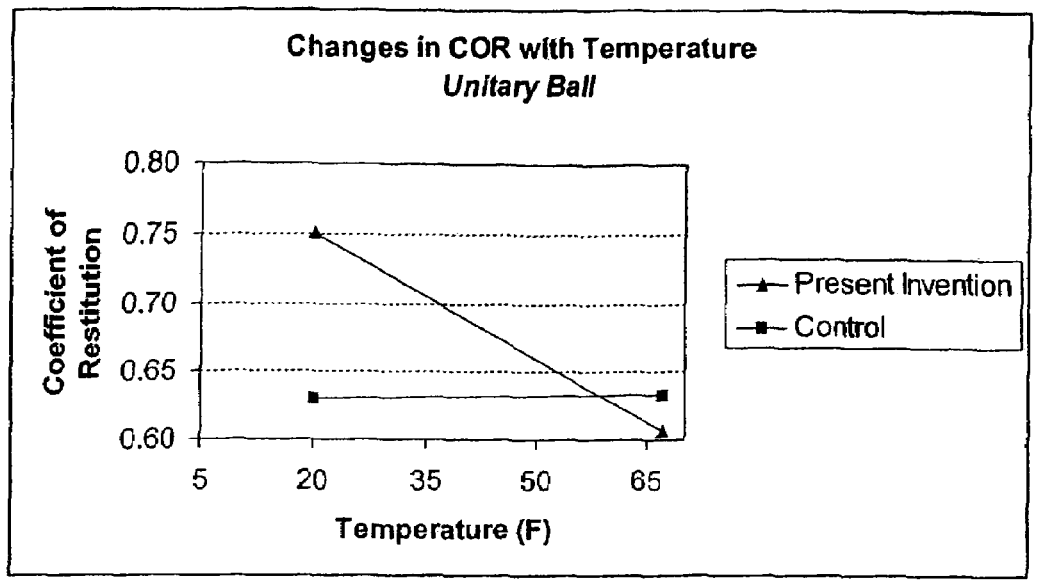
FIGS. 5-6 are graphical representations of the coefficient of restitution in response to temperature changes for a unitary ball molded from a composition of the present invention and a golf ball having a core, inner layer, and cover made according to the invention.

As shown in FIG. 5, the unitary ball, i.e., a golf ball component, molded from a composition of the present invention exhibits appreciable changes in COR with decreased temperature. In particular, the COR of the present invention unitary ball is 0.606 at about 67° F. and 0.751 at 20° F. In contrast, the unitary ball molded with a composition that does not include a trifunctional material according to the present invention exhibits a slight decrease in COR with a decrease in temperature (COR of 0.633 at 67° F. and 0.631 at 20° F.).

Example 2

Resiliency of Dual Cover Ball Formed with Compositions of the Invention

Figure 6:
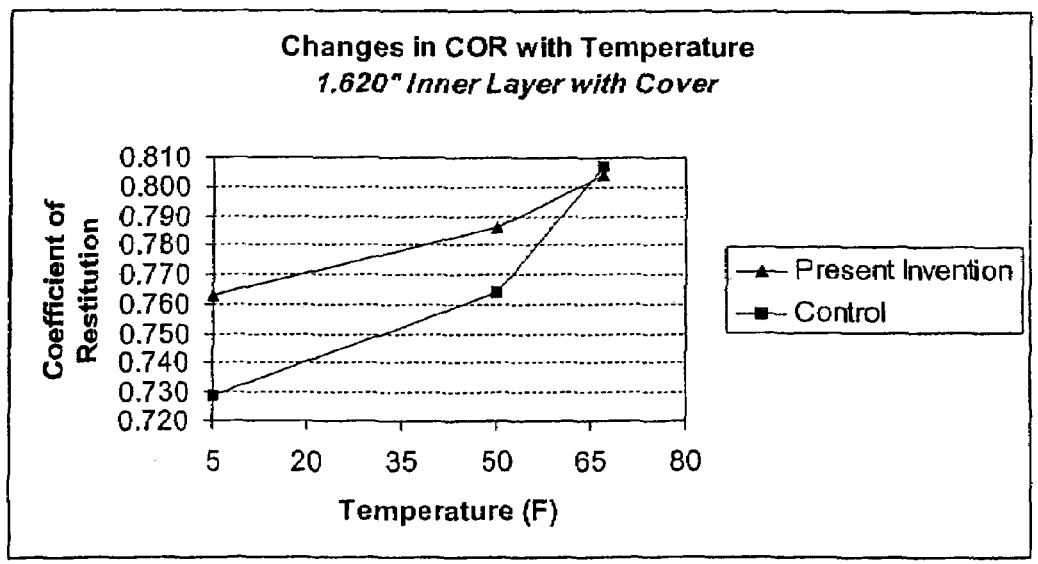

Golf balls were made with a core, a 1.62-inch inner ionomer casing and an outer cover formed according to the formulations in Example 1. As shown in FIG. 6, the golf ball having a cover made from a composition of the present invention exhibits less of a drop in COR when the temperature drops. In particular, as the temperature drops from 72° F. to 5° F., the COR of the ball drops from 0.804 to 0.763, about 5 percent. In contrast, the golf ball made with the control cover exhibits a drop in COR from 0.807 to 0.729 as the temperature drops from 72° F. to 5° F., which is greater than about 9 percent.

Example 3

Heat Resistance of Golf Balls Made According to the Invention

Golf balls having covers made with the compositions of the present invention were compared to golf balls having covers made without the incorporation of a trifunctional material. The formulations of the cover compositions are as follows:

| Formulations | Prepolymer | Curing Agent | Additive |
|---|---|---|---|
| Control 1 | 1 eq. polyurea prepolymer[1] @ 6.32% NCO | 0.95 eq. secondary diamine[3] | 3.5% white dispersion[4] |
| Present Invention A | 1 eq. polyurea prepolymer[1] with 10% isocyanate trimer of hexamethylene diisocyanate[2] @ 7.95% NCO | 0.95 eq. secondary diamine[3] | 3.5% white dispersion[4] |
| Present Invention B | 1 eq. polyurea prepolymer[1] with 7% isocyanate trimer of hexamethylene diisocyanate[2] @ 6.35% NCO | 0.95 eq. secondary diamine[3] | 3.5% white dispersion[4] |

[1]Polyurea prepolymer includes 4,4-dicyclohexylmethane diisocyanate ($H_{12}$MDI and Jeffamine D 2000 (a polyether amine manufactured by Huntsman Corporation).
[2]Desmodur N-3300 (an isocyanurate trimer of hexamethylene diisocyanate), manufactured by Bayer Corporation.
[3]Clearlink 1000 (4,4'-bis-(sec-butylamino)-dicyclohexylmethane), manufactured by Dorf Ketal Chemicals India PVT, Ltd.
[4]HCC-19584 White Dispersion, manufactured by The PolyOne Corporation.

The golf balls were then subjected to ultraviolet exposure for eight days. As shown in Table 1, the golf balls made with a trifunctional material according to the present invention, in this case 7% or 10% isocyanate trimer of hexamethylene diisocyanate, exhibited greater heat resistance as compared to the control balls.

TABLE 1

| | Ultraviolet Exposure | |
|---|---|---|
| UV Exposure | 5 Days | 8 Days |
| Control 1 | Moderate wrinkling of cover | Severe wrinkling of cover |
| Present Invention A | No change | No change |
| Present Invention B | No change | No change |

Example 4

Heat Resistance of Golf Balls Made According to the Invention

Golf balls having covers made with the compositions of the present invention were compared to golf balls having covers made without the incorporation of a trifunctional material. The formulations of the cover compositions are as follows:

| Formulations | Prepolymer | Curing Agent | Additive |
|---|---|---|---|
| Control 2 | 1 eq. polyurea prepolymer[1] @ 6.32% NCO | 0.95 eq. amine-terminated curing agent[3] | 3.5% white dispersion[4] |
| Present Invention C | 1 eq. polyurea prepolymer[1] with 10% isocyanate trimer of hexamethylene | 0.95 eq. amine-terminated curing agent[3] | 3.5% white dispersion[4] |

-continued

| Formulations | Prepolymer | Curing Agent | Additive |
|---|---|---|---|
| | diisocyanate[2] @ 7.25% NCO | | |

[1]Polyurea prepolymer includes 4,4-dicyclohexylmethane diisocyanate ($H_{12}$MDI and Jeffamine D 2000 (a polyether amine manufactured by Huntsman Corporation).
[2]Desmodur N-3300 (an isocyanurate trimer of hexamethylene diisocyanate), manufactured by Bayer Corporation.
[3]Jefflink 754 (N,N'-diisopropyl-isophoronediamine), commercially available from Huntsman Corporation.
[4]HCC-19584 White Dispersion, manufactured by The PolyOne Corporation.

The golf balls were then subjected to ultraviolet exposure for eight days. As shown in Table 2, the golf balls made with a trifunctional material according to the present invention, in this case 10% isocyanate trimer of hexamethylene diisocyanate, exhibited much greater heat resistance as compared to the control balls. In particular, the control golf balls exhibited severe wrinkling and melting when observed after 5 days of UV exposure, whereas the golf balls made according to the present invention exhibited no signs of wrinkling after 8 days of UV exposure.

TABLE 2

| | Ultraviolet Exposure | |
|---|---|---|
| UV Exposure | 5 Days | 8 Days |
| Control 2 | Severe wrinkling and/or melting of cover | Severe wrinkling and/or melting of cover |
| Present Invention C | No change | No change |

Example 5

Resiliency of Compositions Made According to the Invention

The compositions of the invention were subjected to Dynamic Mechanical Analysis (DMA) in order to discern the tan δ (loss modulus/storage modulus) of the material, which is indicative of the resiliency of the material, i.e., the higher the tan δ, the less resilient the material. Compositions were made are follows:

| Formulations | Prepolymer | Curative 1 | Curative 2 |
|---|---|---|---|
| Control 3 | 1 eq. polyurea prepolymer[1] @ 10% NCO | 0.95 eq. secondary diamine[3] | — |
| Present Invention D | 1 eq. Isocyanate[2] @ 29.6% NCO | 0.80 eq. polycaprolactone triol[3] | 0.15 eq. polyester polyol[4] |

[1]Polyurea prepolymer includes 4,4-dicyclohexylmethane diisocyanate ($H_{12}$MDI and Jeffamine D 2000 (a polyether amine manufactured by Huntsman Corporation).
[2]Vestanat T 6040 Isocyanate (a blend of isophorone diisocyanate and isocyanurate trimer of isophorone diisocyanate), manufactured by Degussa Corporation.
[3]Tone 0305, manufactured by Dow Chemical Company.
[4]Oxyester T 1136, manufactured by Degussa Corporation.

Figure 7:
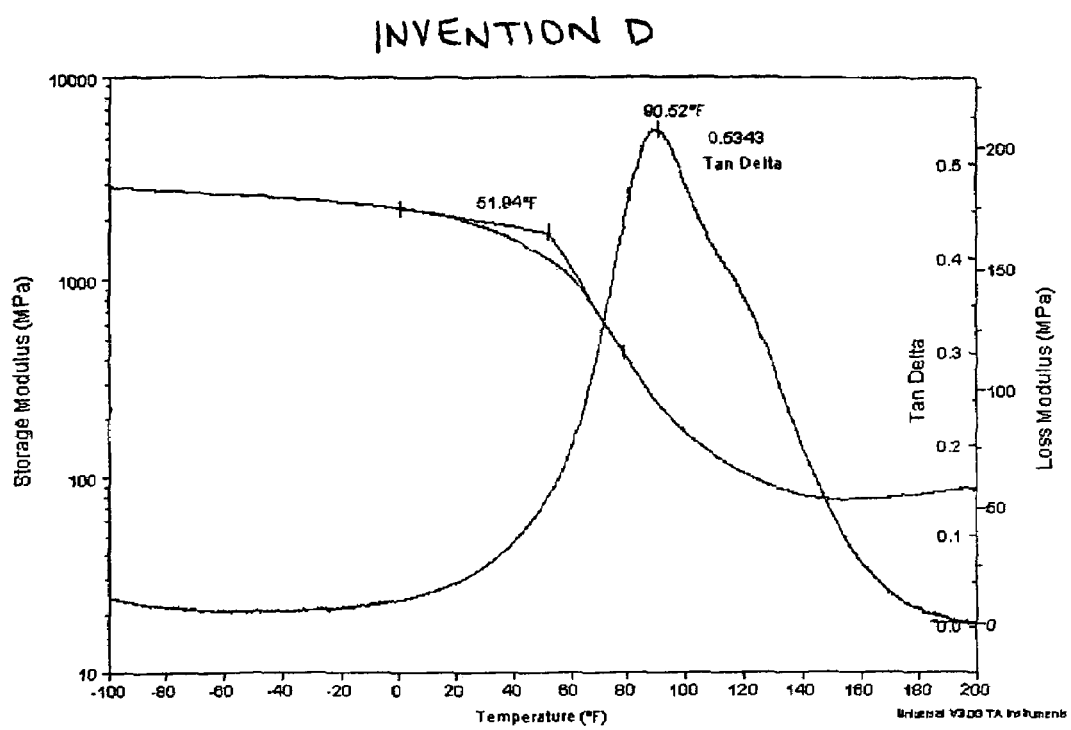
FIGS. 7-8 are graphical representations of the tangent delta-temperature relationship for compositions made according to the invention and a comparison composition.
Figure 8:
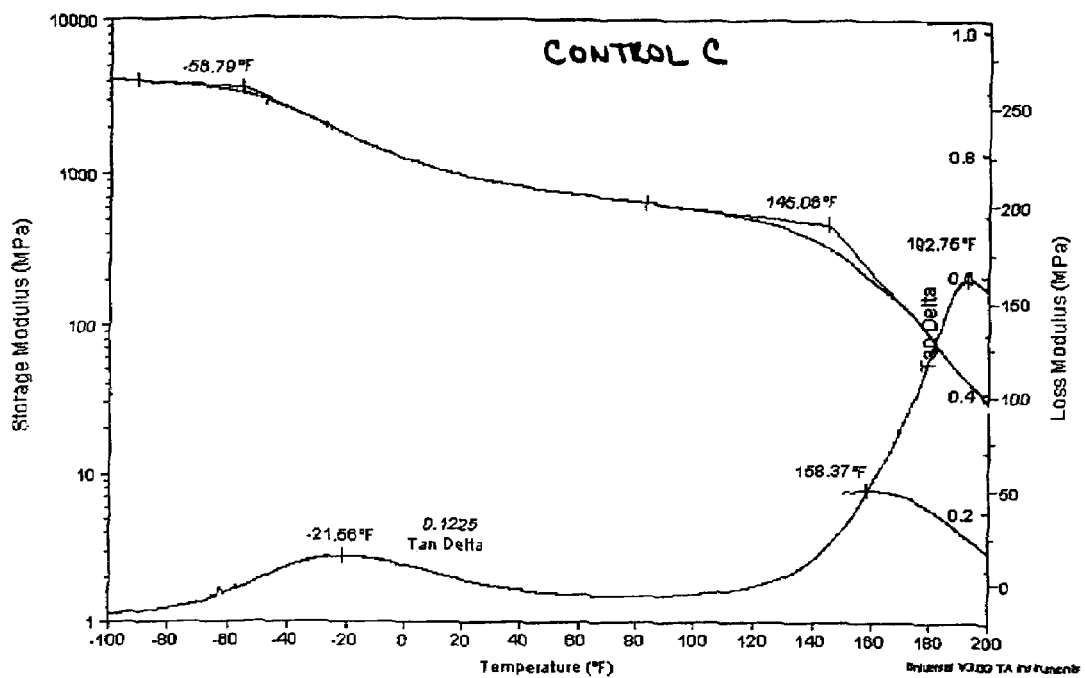

For DMA, each sample was cut to approximately 17 mm×12 mm×1 mm and run in a single cantilever mode. The samples were then equilibrated at −120° C. and then heated to 150° C. at a rate of 2° C./min. As shown in FIG. 7 (the invention composition), the tan δ decreases as the temperature decreases at least in the range of about 70° F. to about 20° F. In contrast, the tan δ of the control composition (FIG. 8) actually increases as the temperature decreases from about 70° F. to about 20° F.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising a core and a cover, wherein at least one layer comprises a composition comprising:
    a prepolymer comprising a reaction product of an isocyanate and an amine-terminated component with a molecular weight of at least 500, wherein the isocyanate comprises three functional groups; and
    a curative blend comprising a primary diamine and a tri-functional amine terminated curing agent, wherein the tri-functional amine terminated curing agent is selected from the group consisting of ethylene oxide based tri-amines, N-(2-aminoethyl)-1,3-propylenediamine and mixtures thereof;
    and
    wherein the composition has an average molecular weight between crosslinks of about 3000 or greater.

2. The golf ball of claim 1, wherein the second curing agent primary diamine is selected from the group consisting of 4,4'-diaminodicyclohexylmethane, 3,3'-dimethyl-4,4-diaminodicyclohexylmethane, polyoxyethylene diamines, polyoxypropylene diamines, (ethylene oxide-capped)-polyoxypropylene diamines, polytetramethylene ether diamines, and mixtures thereof.

3. The golf ball of claim 1, wherein tri-functional amine-terminated curing agent is an ethylene oxide based triamine.

4. The golf ball of claim 1, wherein the isocyanate is selected from the group consisting of an isocyanurate trimer of hexamethylene diisocyanate, an isocyanurate trimer of toluene diisocyanate, an isocyanurate trimer of isophorone diisocyanate, a blend of isophorone diisocyanate and an isocyanurate trimer of isophorone diisocyanate, and mixtures thereof.

5. A golf ball comprising a core, an inner cover layer, and an outer cover layer, wherein the outer cover layer is formed of a composition comprising:
    a prepolymer, wherein the prepolymer comprises an isocyanate and an amine-terminated component; and
    a curative comprising a first primary diamine and a tri-functional amine-terminated component, wherein the tri-functional amine-terminated component is selected from the group consisting of ethylene oxide based tri-amines, N-(2-aminoethyl)-1,3-propylenediamine and mixtures thereof.

6. The golf ball of claim 5, wherein the inner cover layer comprises a thermoplastic material.

7. The golf ball of claim 6, wherein the thermoplastic material comprises an ionomer resin.

8. The golf ball of claim 5, wherein the primary diamine is selected from the group consisting of 4,4'-diaminodicyclohexylmethane, 3,3'-dimethyl-4,4'-diaminodicyclohexylmethane, polyoxyethylene diamines, polyoxypropylene diamines, (ethylene oxide-capped)-polyoxypropylene diamines, polytetramethylene ether diamines, and mixtures thereof.

9. The golf ball of claim 5, wherein the trifunctional amine-terminated component is an ethylene oxide based triamine.

10. A golf ball comprising a core and a cover, wherein at least one layer comprises a composition comprising:
 a prepolymer comprising a reaction product of an isocyanate and an amine-terminated component, wherein at least one of the isocyanate comprises or amine-terminated component comprises three functional groups; and
 a curative comprising a first component comprising a primary diamine and a second component comprising a tri-functional amine-terminated component selected from the group consisting of ethylene oxide based triamines, N-(2-aminoethyl)-1,3-propylenediamine, and mixtures thereof.

11. The golf ball of claim 10, wherein the isocyanate is selected from the group consisting of an isocyanurate trimer of hexamethylene diisocyanate, an isocyanurate trimer of toluene diisocyanate, an isocyanurate trimer of isophorone diisocyanate, a blend of isophorone diisocyanate and an isocyanurate trimer of isophorone diisocyanate, and mixtures thereof.

12. The golf ball of claim 10, wherein the at least one layer is a cover layer.

13. The golf ball of claim 10, wherein the cover comprises an inner cover layer and an outer cover layer, and wherein the outer cover layer comprises the composition.

14. The golf ball of claim 13, wherein the inner cover layer comprises an ionomer resin.

15. The golf ball of claim 10, wherein primary diamine is selected from the group consisting of 4,4'-diaminodicyclohexylmethane, 3,3'-dimethyl-4, 4'-diaminodicyclohexylmethane, polyoxyethylene diamines, polyoxypropylene diamines, (ethylene oxide-capped)-polyoxypropylene diamines, polytetramethylene ether diamines, and mixtures thereof.

16. The golf ball of claim 10, wherein the trifunctional amine-terminated component is an ethylene oxide based triamine.

* * * * *